(12) United States Patent
Kobayashi

(10) Patent No.: US 12,517,003 B2
(45) Date of Patent: *Jan. 6, 2026

(54) MEASUREMENT METHOD, MEASUREMENT DEVICE, MEASUREMENT SYSTEM, AND MEASUREMENT PROGRAM

(71) Applicant: SEIKO EPSON CORPORATION, Tokyo (JP)

(72) Inventor: Yoshihiro Kobayashi, Komagane (JP)

(73) Assignee: SEIKO EPSON CORPORATION (JP)

( * ) Notice: Subject to any disclaimer, the term of this patent is extended or adjusted under 35 U.S.C. 154(b) by 239 days.

This patent is subject to a terminal disclaimer.

(21) Appl. No.: 18/076,514

(22) Filed: Dec. 7, 2022

(65) Prior Publication Data
US 2023/0175919 A1    Jun. 8, 2023

(30) Foreign Application Priority Data

Dec. 8, 2021   (JP) .................................. 2021-199213

(51) Int. Cl.
   *G01M 5/00*   (2006.01)
(52) U.S. Cl.
   CPC ........ *G01M 5/0066* (2013.01); *G01M 5/0008* (2013.01)
(58) Field of Classification Search
   None
   See application file for complete search history.

(56) References Cited

U.S. PATENT DOCUMENTS

| | | | |
|---|---|---|---|
| 4,901,575 A * | 2/1990 | Bohannan | G01M 5/0008 73/594 |
| 9,291,604 B2 * | 3/2016 | Kajiwara | G01M 7/00 |
| 2006/0042396 A1 | 3/2006 | Qing et al. | |
| 2008/0061959 A1 * | 3/2008 | Breed | G07C 5/008 340/539.1 |
| 2010/0271199 A1 | 10/2010 | Belov et al. | |
| 2011/0130915 A1 * | 6/2011 | Wright | G01M 17/04 398/118 |

(Continued)

FOREIGN PATENT DOCUMENTS

JP   2019-049095 A   3/2019

*Primary Examiner* — Alvaro E Fortich
*Assistant Examiner* — Carl F.R. Tchatchouang
(74) *Attorney, Agent, or Firm* — Harness, Dickey & Pierce, P.L.C.

(57) ABSTRACT

A measurement method includes: an acceleration data acquisition step of acquiring acceleration data output from an accelerometer that observes an observation point of a structure when a moving body moves on the structure; a speed vibration component calculation step of calculating a first speed vibration component by performing integration processing and filter processing on an acceleration based on the acceleration data; and a displacement amplitude estimation step of estimating a displacement amplitude of the structure when the moving body moves on the structure based on an amplitude of the first speed vibration component and a conversion function calculated based on an approximate expression of deflection of the structure and environmental information including a dimension of the moving body, a dimension of the structure, and a position of the observation point, which are created in advance.

11 Claims, 18 Drawing Sheets

(56) References Cited

U.S. PATENT DOCUMENTS

2012/0204646 A1\* 8/2012 Lee .................. G01M 7/00
                                                                         73/594
2016/0084961 A1   3/2016 Morishita et al.
2017/0097279 A1\* 4/2017 Maki ............... G01M 5/0066

\* cited by examiner

MEASUREMENT METHOD, MEASUREMENT DEVICE, MEASUREMENT SYSTEM, AND MEASUREMENT PROGRAM

The present application is based on, and claims priority from JP Application Serial Number 2021-199213, filed Dec. 8, 2021, the disclosure of which is hereby incorporated by reference herein in its entirety.

BACKGROUND

1. Technical Field

The present disclosure relates to a measurement method, a measurement device, a measurement system, and a measurement program.

2. Related Art

JP-A-2019-49095 discloses an acceleration sensor mounted on a railway bridge, and a deflection measurement device that sets an output of the acceleration sensor when the railway bridge is in an unloaded state as a zero point of an acceleration, corrects the zero point of the acceleration output by the acceleration sensor when the railway bridge is in a loaded state, and estimates, after the zero point correction, a deflection amount of the railway bridge by preventing drift by applying twice integration, Bayesian estimation, a Kalman filter, or the like.

However, in FIG. 3C in JP-A-2019-49095, displacement in a section in which the railway bridge is in the loaded state is increased more than in a section in which the railway bridge is in the unloaded state. However, it is obvious that an expected displacement waveform is a waveform in which the displacement in the section in which the railway bridge is in the loaded state is decreased more than in the section in which the railway bridge is in the unloaded state. This is similar to a result of reducing a signal component in a low frequency range of the displacement waveform together with a drift component in the low frequency range. Therefore, in a method of estimating a deflection amount by the deflection measurement device disclosed in JP-A-2019-49095, the drift and the component in the low frequency range of the displacement waveform are also reduced. Therefore, there is a possibility that an original displacement amplitude cannot be accurately estimated.

SUMMARY

According to an aspect of the present disclosure, a measurement method includes: an acceleration data acquisition step of acquiring acceleration data output from an accelerometer that observes an observation point of a structure when a moving body moves on the structure; a speed vibration component calculation step of calculating a first speed vibration component by performing integration processing and filter processing on an acceleration based on the acceleration data; and a displacement amplitude estimation step of estimating a displacement amplitude of the structure when the moving body moves on the structure based on an amplitude of the first speed vibration component and a conversion function calculated based on an approximate expression of deflection of the structure and environmental information including a dimension of the moving body, a dimension of the structure, and a position of the observation point, which are created in advance.

According to an aspect of the present disclosure, a measurement device includes: an acceleration data acquisition unit configured to acquire acceleration data output from an accelerometer that observes an observation point of a structure when a moving body moves on the structure; a speed vibration component calculation unit configured to calculate a first speed vibration component by performing integration processing and filter processing on an acceleration based on the acceleration data; and a displacement amplitude estimation unit configured to estimate a displacement amplitude of the structure when the moving body moves on the structure based on an amplitude of the first speed vibration component and a conversion function calculated based on an approximate expression of deflection of the structure and environmental information including a dimension of the moving body, a dimension of the structure, and a position of the observation point, which are created in advance.

According to an aspect of the present disclosure, a measurement system includes: the measurement device according to the above aspect; and the accelerometer.

According to an aspect of the present disclosure, a non-transitory computer-readable storage medium stores a measurement program, the measurement program causing a computer to execute: an acceleration data acquisition step of acquiring acceleration data output from an accelerometer that observes an observation point of a structure when a moving body moves on the structure; a speed vibration component calculation step of calculating a first speed vibration component by performing integration processing and filter processing on an acceleration based on the acceleration data; and a displacement amplitude estimation step of estimating a displacement amplitude of the structure when the moving body moves on the structure based on an amplitude of the first speed vibration component and a conversion function calculated based on an approximate expression of deflection of the structure and environmental information including a dimension of the moving body, a dimension of the structure, and a position of the observation point, which are created in advance.

DESCRIPTION OF EXEMPLARY EMBODIMENTS

Hereinafter, preferred embodiments of the present disclosure will be described in detail with reference to the drawings. The embodiments to be described below do not unduly limit contents of the present disclosure described in the claims. Not all configurations to be described below are necessarily essential components of the present disclosure.

1. First Embodiment

1-1. Configuration of Measurement System

A moving body passing through a superstructure of a bridge that is a structure according to the present embodiment is a vehicle, a railway vehicle, or the like that has a large weight and can be measured by BWIM. The BWIM is an abbreviation of bridge weigh in motion, and is a technology in which a bridge is regarded as a scale, deformation of the bridge is measured, and whereby the weight and the number of axles of the moving body passing through the bridge is measured. The superstructure of the bridge, which enables analysis of the weight of the moving body passing through the bridge, based on a response such as deformation or strain, is a structure in which the BWIM functions. The BWIM system, which applies a physical process between an action on the superstructure of the bridge and the response, enables the measurement of the weight of the moving body that travels on the bridge. Hereinafter, a measurement system for implementing a measurement method according to the present embodiment will be described by taking a case where the moving body is a railway vehicle as an example.

Figure 1:
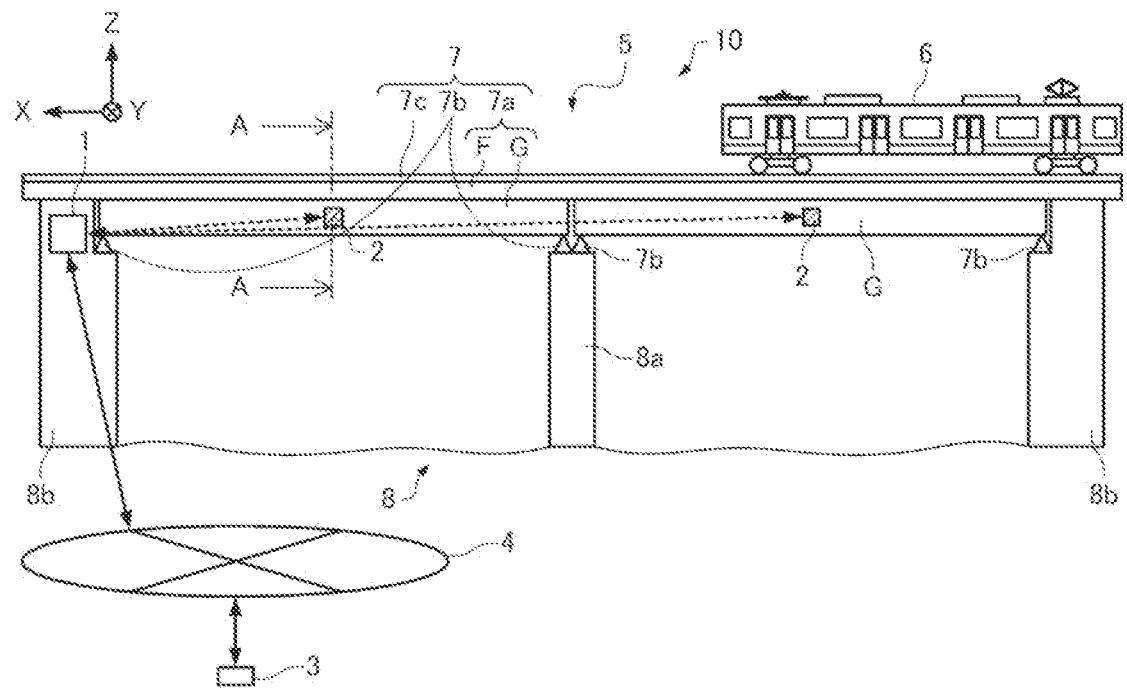
FIG. 1 is a diagram showing a configuration example of a measurement system.

FIG. 1 is a diagram showing an example of the measurement system according to the present embodiment. As show in FIG. 1, a measurement system 10 according to the present embodiment includes a measurement device 1 and at least one accelerometer 2 provided in a superstructure 7 of a bridge 5. The measurement system 10 may include a monitoring device 3.

Figure 2:
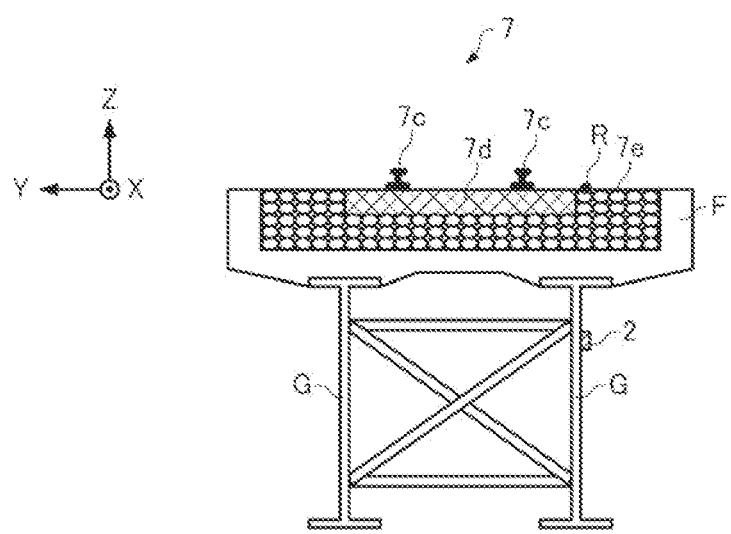
FIG. 2 is a cross-sectional view of a superstructure in FIG. 1 taken along line A-A.

The bridge 5 includes the superstructure 7 and a substructure 8. FIG. 2 is a cross-sectional view of the superstructure 7 taken along line A-A in FIG. 1. As shown in FIGS. 1 and 2, the superstructure 7 includes a bridge floor 7a including a floor plate F, a main girder G, a cross girder, which is not shown, and the like, bearings 7b, rails 7c, a tie 7d, and a ballast 7e. As shown in FIG. 1, the substructure 8 includes bridge piers 8a and bridge abutments 8b. The superstructure 7 is a structure across any one of the bridge abutment 8b and the bridge pier 8a adjacent to each other, two adjacent bridge abutments 8b, or two adjacent bridge piers 8a. Both end portions of the superstructure 7 are located at positions of the bridge abutment 8b and the bridge pier 8a adjacent to each other, at positions of the two adjacent bridge abutments 8b, or at positions of the two adjacent bridge piers 8a.

When a railway vehicle 6 enters the superstructure 7, the superstructure 7 is bent due to a load of the railway vehicle 6. Since the railway vehicle 6 includes a plurality of vehicles coupled to each other, the bending of the superstructure 7 is periodically repeated as the vehicles pass through the superstructure 7. On the other hand, since the superstructure 7 has a natural vibration frequency as a structure, natural vibration of the superstructure 7 may be excited when the railway vehicle 6 passes through the superstructure 7. When the natural vibration of the superstructure 7 is excited, the bending of the superstructure 7 is periodically repeated.

The measurement device 1 and the accelerometers 2 are coupled by, for example, a cable which is not shown and communicate with one another via a communication network such as CAN. CAN is an abbreviation for controller area network. Alternatively, the measurement device 1 and the accelerometers 2 may communicate with one another via a wireless network.

Each accelerometer 2 outputs acceleration data used to estimate a displacement amplitude due to the bending of the superstructure 7 when the railway vehicle 6, which is a moving body, moves on the superstructure 7, which is a structure. The accelerometer 2 may be, for example, an accelerometer using a crystal acceleration sensor or an accelerometer using a MEMS sensor. MEMS is an abbreviation for micro electro mechanical systems.

In the present embodiment, each accelerometer 2 is installed at a central portion of the superstructure 7 in a longitudinal direction, specifically, at a central portion of the main girder G in the longitudinal direction. However, each accelerometer 2 only needs to be able to detect an acceleration for estimating the displacement amplitude of the superstructure 7, and an installation position thereof is not limited to the central portion of the superstructure 7. When each accelerometer 2 is provided on the floor plate F of the superstructure 7, the accelerometer 2 may be damaged due to traveling of the railway vehicle 6. Since the measurement accuracy may be affected by local deformation of the bridge floor 7a, in the examples of FIGS. 1 and 2, each accelerometer 2 is provided at the main girder G of the superstructure 7.

The floor plate F, the main girder G, and the like of the superstructure 7 are bent in a vertical direction due to a load of the railway vehicle 6 passing through the superstructure 7. Each accelerometer 2 detects an acceleration of the bending of the floor plate F or the main girder G caused by the load of the railway vehicle 6 passing through the superstructure 7.

The measurement device 1 estimates, based on the acceleration data output from each accelerometer 2, the displacement amplitude of the superstructure 7 when the railway vehicle 6 passes through the superstructure 7. The measurement device 1 is installed on, for example, the bridge abutment 8b.

The measurement device 1 and the monitoring device 3 can communicate with each other via, for example, a wireless network of a mobile phone and a communication network 4 such as the Internet. The measurement device 1 transmits, to the monitoring device 3, measurement data including the displacement amplitude of the superstructure 7 when the railway vehicle 6 passes through the superstructure 7. The monitoring device 3 may store the information in a storage device which is not shown, and may perform, based on the information, processing such as monitoring of the railway vehicle 6 or determination of an abnormality in the superstructure 7.

In the present embodiment, the bridge 5 is a railroad bridge, and is, for example, a steel bridge, a girder bridge, or an RC bridge. RC is an abbreviation for reinforced-concrete.

As shown in FIG. 2, in the present embodiment, an observation point R is set in association with the accelerometer 2. In the example of FIG. 2, the observation point R is set at a position on a surface of the superstructure 7 in a vertically upward direction of the accelerometer 2 provided at the main girder G. That is, the accelerometer 2 is an observation device that observes the observation point R. The accelerometer 2 detects an acceleration which is a response to an action of a plurality of parts of the railway vehicle 6 moving on the superstructure 7, which is a structure, at the observation point R, and outputs data including the detected acceleration. For example, each of the plurality of parts of the railway vehicle 6 is an axle or a wheel, and is hereinafter assumed to be an axle. The accelerometer 2 may be provided at a position where the acceleration generated at the observation point R due to the traveling of the railway vehicle 6 can be detected. The accelerometer 2 is preferably provided at a position close to the observation point R in the vertical direction.

The number and installation positions of the accelerometers 2 are not limited to the examples shown in FIGS. 1 and 2, and various modifications can be made.

The measurement device 1 acquires, based on the acceleration data output from the accelerometer 2, an acceleration in a direction intersecting a surface of the superstructure 7 on which the railway vehicle 6 moves. The surface of the superstructure 7 on which the railway vehicle 6 moves is defined by a direction along which the railway vehicle 6 moves, that is, an X direction which is the longitudinal direction of the superstructure 7, and a direction orthogonal to the direction along which the railway vehicle 6 moves, that is, a Y direction which is a width direction of the superstructure 7. Since the observation point R is bent in a direction orthogonal to the X direction and the Y direction due to the traveling of the railway vehicle 6, the measurement device 1 preferably acquires the acceleration in a direction orthogonal to the X direction and the Y direction, that is, a Z direction which is a normal direction of the floor plate F, in order to accurately calculate a magnitude of the acceleration of the bending.

Figure 3:
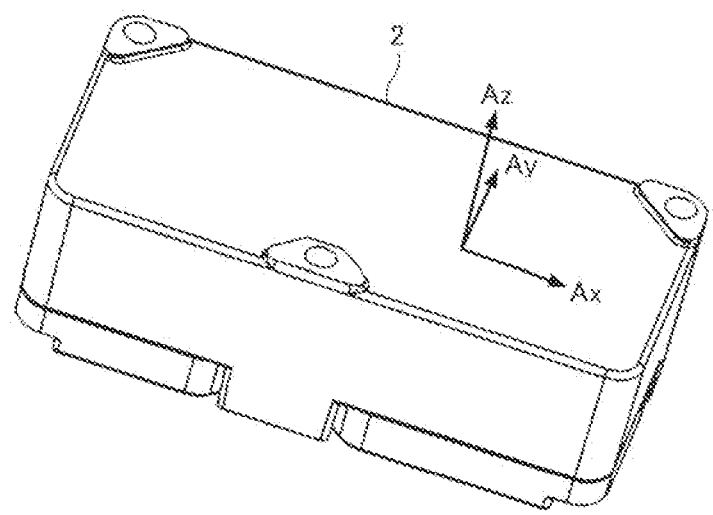
FIG. 3 is an explanatory diagram of an acceleration detected by an acceleration sensor.

FIG. 3 is a diagram showing the acceleration detected by the accelerometer 2. The accelerometer 2 detects accelerations generated in respective axial directions of three axes orthogonal to one another.

In order to detect the acceleration of the bending at the observation point R caused by the traveling of the railway vehicle 6, the accelerometer 2 is installed such that one of three detection axes, which are an x axis, a y axis, and a z axis, is in a direction intersecting the X direction and the Y direction. In FIGS. 1 and 2, the accelerometers 2 are installed such that one axis thereof is in the direction intersecting the X direction and the Y direction. The observation point R is bent in the direction orthogonal to the X direction and the Y direction. Therefore, in order to accurately detect the acceleration of the bending, ideally, the accelerometers 2 are installed such that one axis thereof is aligned with the Z direction orthogonal to the X direction and the Y direction, that is, the normal direction of the floor plate F.

However, when the accelerometer 2 is installed on the superstructure 7, an installation location may be inclined. In the measurement device 1, even if one of the three detection axes of the accelerometer 2 is installed so as not to be aligned with the normal direction of the floor plate F, since the one axis is substantially oriented in the normal direction, an error is small and thus can be ignored. The measurement device 1 can correct a detection error due to inclination of the accelerometer 2 based on a three-axis combined acceleration obtained by combining the accelerations in the x axis, the y axis, and the z axis even if one of the three detection axes of the accelerometer 2 is installed so as not to be aligned with the normal direction of the floor plate F. The accelerometer 2 may further be a uniaxial accelerometer that detects an acceleration generated at least in a direction substantially parallel to the vertical direction or an acceleration in the normal direction of the floor plate F.

In the present embodiment, the measurement device 1 estimates, based on the acceleration data output from the accelerometer 2 when the railway vehicle 6 passes through the superstructure 7 and a conversion function $f_{conv}$, the displacement amplitude of the superstructure 7 when the railway vehicle 6 passes through the superstructure 7. The conversion function $f_{conv}$ is a function representing a relationship between the displacement amplitude of the superstructure 7 and the amplitude of the speed vibration component. In the present embodiment, the calculation is performed based on the acceleration data output from the accelerometer 2, an approximate expression of the deflection of the superstructure 7, and environmental information created in advance. The environmental information includes at least a dimension of the railway vehicle 6, a dimension of the superstructure 7, and a position of the observation point R. In the present embodiment, the measurement device 1 calculates the conversion function $f_{conv}$ based on the acceleration data output from the accelerometer 2 when the railway vehicle 6 passes through the superstructure 7, and stores each coefficient value of the calculated conversion function $f_{conv}$ in a storage unit, which is not shown. Then, the measurement device 1 estimates the displacement amplitude of the superstructure 7 based on the acceleration data and the conversion function $f_{conv}$ stored in the storage unit.

Hereinafter, details of the measurement method according to the present embodiment executed by the measurement system 10 will be described.

1-2. Details of Measurement Method

Figure 4:
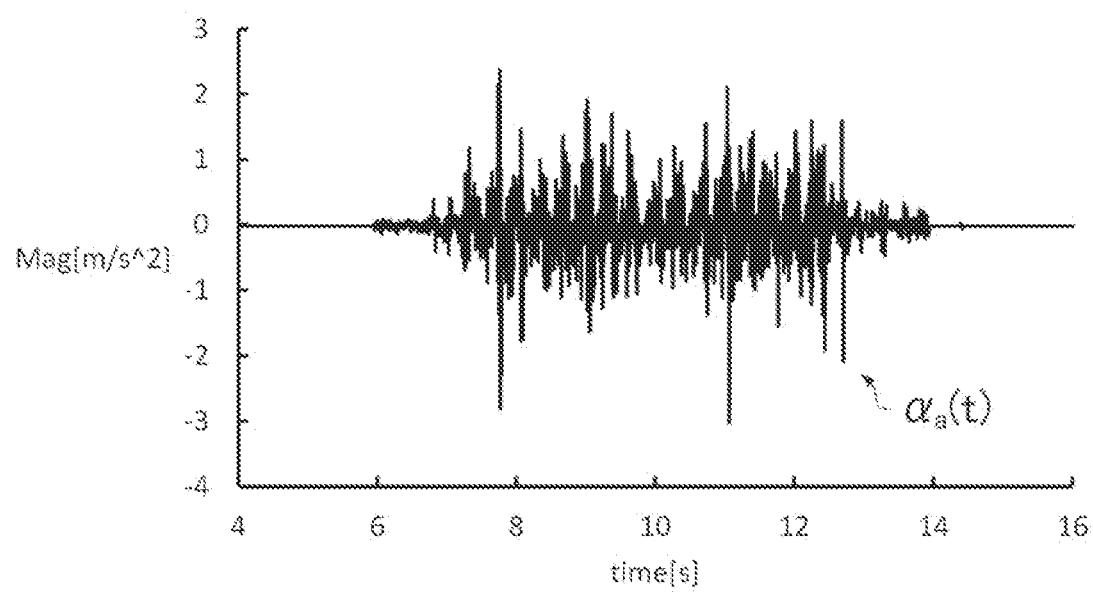
FIG. 4 is a diagram showing an example of an acceleration $\alpha_a(t)$.
Figure 5:
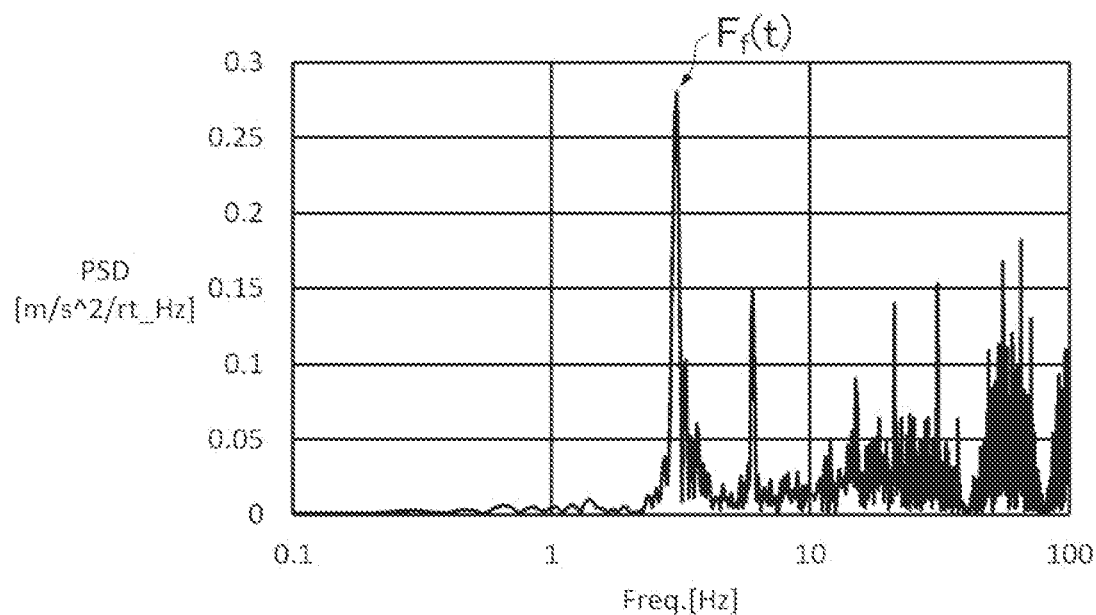
FIG. 5 is a diagram showing a power spectrum density of the acceleration $\alpha_a(t)$.

First, in order to calculate the conversion function $f_{conv}$, the measurement device 1 acquires acceleration data output from the accelerometer 2 when the railway vehicle 6 passes through the superstructure 7 of the bridge 5, and calculates a fundamental frequency $F_f$ of the acceleration $\alpha_a(t)$ based on the acceleration data. Specifically, the measurement device 1 calculates a power spectrum density by performing fast Fourier transform processing on the acceleration $\alpha_a(t)$, and calculates a peak of the power spectrum density as the fundamental frequency $F_f$. FIG. 4 shows an example of the acceleration $\alpha_a(t)$. FIG. 5 shows the power spectrum density obtained by performing the fast Fourier transform processing on the acceleration $\alpha_a(t)$ in FIG. 4. In the example of FIG. 5, the fundamental frequency $F_f$ is calculated as 3.05 Hz.

Figure 6:
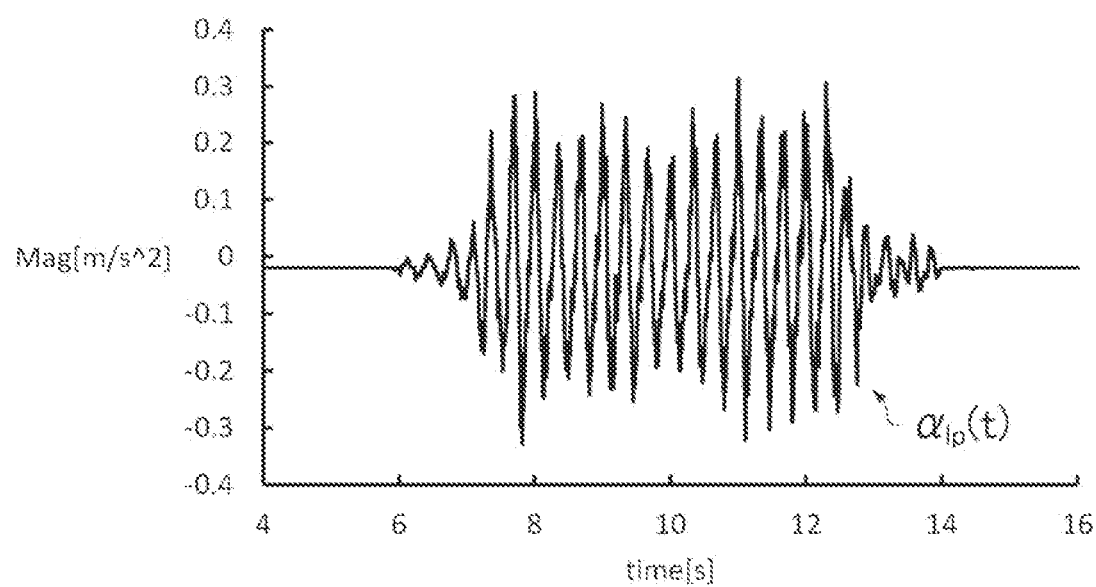
FIG. 6 is a diagram showing an example of an acceleration $\alpha_{lp}(t)$.

Since the acceleration $\alpha_a(t)$ includes environmental noise in a high frequency range, the measurement device 1 calculates, in order to reduce the environmental noise, an acceleration $\alpha_{lp}(t)$ obtained by performing low-pass filter processing on the acceleration $\alpha_a(t)$, as in Equation (1). Here, a cutoff frequency of the low-pass filter processing is set to a frequency higher than the fundamental frequency $F_f$. FIG. 6 shows an example of the acceleration $\alpha_{lp}(t)$ obtained by performing the low-pass filter processing on the acceleration $\alpha_a(t)$ in FIG. 4. By the low-pass filter processing, a response acceleration of the deflection of the superstructure 7 when the railway vehicle 6 passes through the superstructure 7 is seen.

$$\alpha_{lp}(t)=f_{LPF}(\alpha_a(t)) \quad (1)$$

Figure 7:
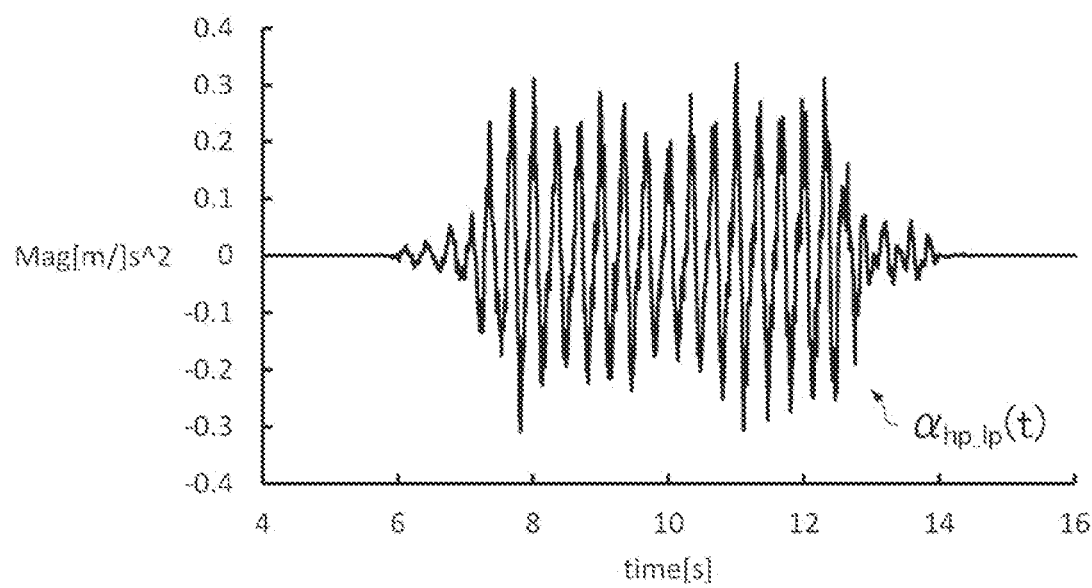
FIG. 7 is a diagram showing an example of an acceleration $\alpha_{hp\_lp}(t)$.

Since the acceleration $\alpha_{lp}(t)$ includes a drift noise and an offset error of a bias in the low frequency range, the measurement device 1 calculates, in order to reduce the drift noise and the offset error, an acceleration $\alpha_{hp\_lp}(t)$ obtained by performing the high-pass filter processing on the acceleration $\alpha_{lp}(t)$, as in Equation (2). Here, the cutoff frequency of the high-pass filter processing is set to a frequency sufficiently lower than the fundamental frequency $F_f$. FIG. 7 shows an example of the acceleration $\alpha_{hp\_lp}(t)$ obtained by performing the high-pass filter processing on the acceleration $\alpha_{lp}(t)$ in FIG. 6.

$$\alpha_{hp\_lp}(t)=f_{HPF}(\alpha_{lp}(t)) \quad (2)$$

Figure 8:
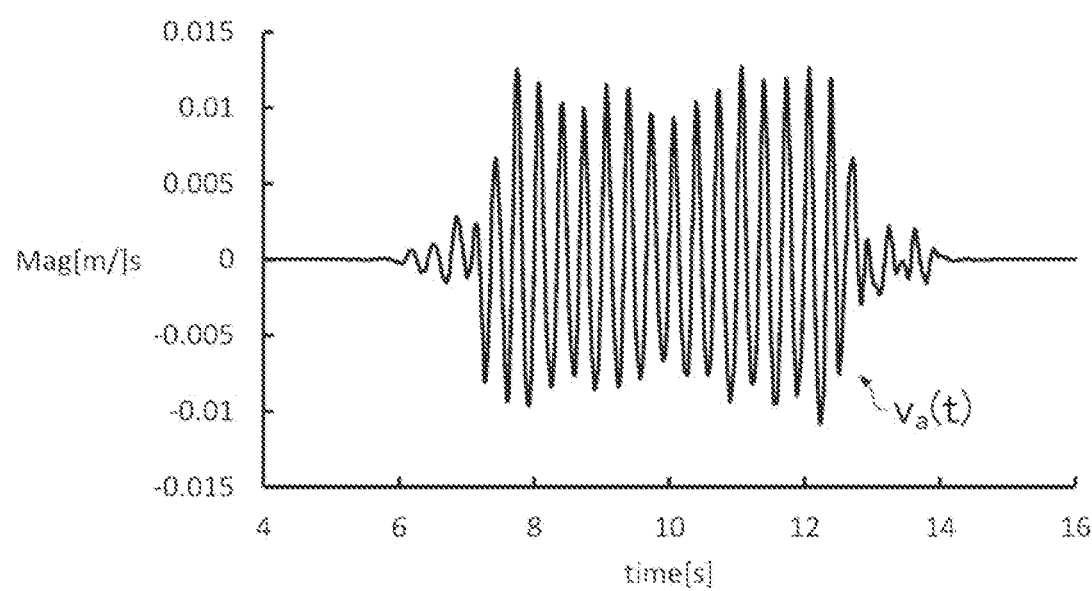
FIG. 8 is a diagram showing an example of a speed $v_a(t)$.

Next, the measurement device 1 integrates the acceleration $\alpha_{hp\_lp}(t)$ to calculate a speed $v_a(t)$ as in Equation (3). FIG. 8 shows an example of the speed $v_a(t)$ obtained by integrating the acceleration $\alpha_{hp\_lp}(t)$ in FIG. 7.

$$v_a(t) = \int_0^t \alpha_{hp\_lp}(t)dt \quad (3)$$

Next, the measurement device 1 calculates a moving average interval $t_p$ according to Equation (4), and calculates the speed $v_{ma}(t)$ from which a vibration component is removed by performing a moving average on the speed $v_a(t)$ in the interval $t_p$ that is substantially a period of the fundamental frequency $F_f$, as in Equation (5). Here, $\Delta T$ in Equation (4) is a data rate of the acceleration $\alpha_a(t)$. In Equation (5), k is a sample number.

$$t_p = \left\lceil \frac{1}{2F_f \Delta T} \right\rceil \Delta T \quad (4)$$

$$v_{ma}(t) = \sum_{k=t-t_p}^{t+t_p} v_a(k) \quad (5)$$

Figure 9:
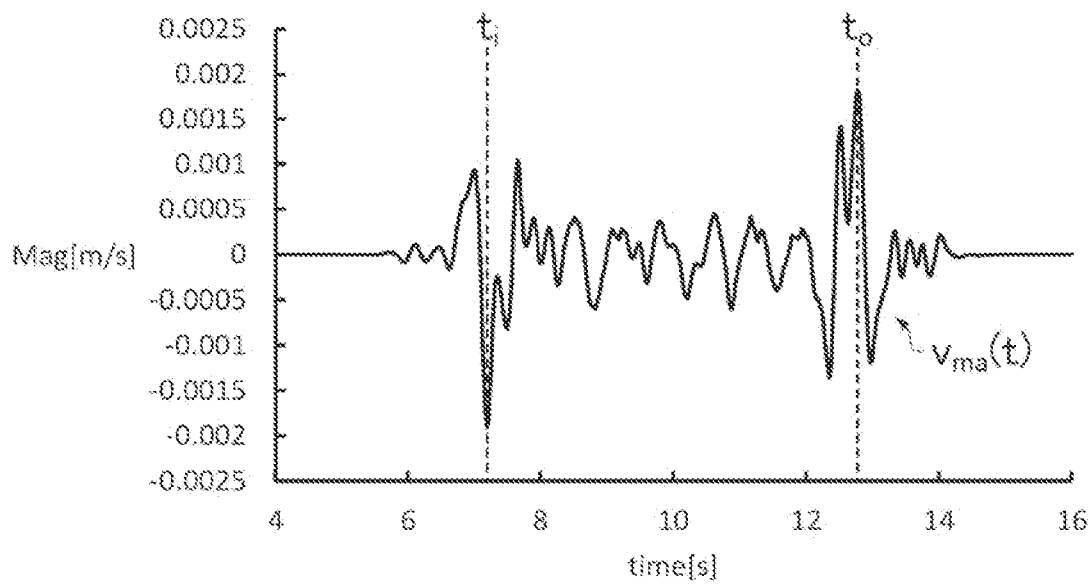
FIG. 9 is a diagram showing an example of a speed $v_{ma}(t)$, an entry time point $t_i$, and an exit time point $t_o$.

Then, the measurement device 1 calculates a time point at a minimum peak of falling of a value range in which the speed $v_{ma}(t)$ has a negative value as an entry time point $t_i$, and calculates a time point at a maximum peak of rising of a value range in which the speed $v_{ma}(t)$ has a positive value as an exit time point $t_o$. The entry time point $t_i$ is a time point at which a leading axle of a leading vehicle of the railway vehicle 6 passes through an entry end of the superstructure 7. The exit time point $t_o$ is a time point at which a rearmost axle of a rearmost vehicle of the railway vehicle 6 passes through an exit end of the superstructure 7. FIG. 9 shows an example of the speed $v_{ma}(t)$, the entry time point $t_i$, and the exit time point $t_o$ obtained by moving average of the speed $v_a(t)$ in FIG. 8.

Next, the measurement device 1 calculates, as a difference between the exit time point $t_o$ and the entry time point $t_i$, a passing time $t_s$ during which the railway vehicle 6 passes through the superstructure 7 of the bridge 5, as in Equation (6).

$$t_s = t_o - t_i \quad (6)$$

The measurement device 1 calculates, as the number of vehicles $C_T$ of the railway vehicle 6, a maximum integer less than or equal to the number obtained by subtracting 1 from a product of the passing time $t_s$ and the fundamental frequency $F_f$, as in Equation (7).

$$C_T = \lfloor t_s F_f - 1 \rfloor = \text{floor}(t_s F_f - 1) = \{t_s F_f - 1\} \quad (7)$$

The measurement device 1 stores observation information including the entry time point $t_i$, the exit time point $t_o$, the passing time $t_s$, and the number of vehicles $C_T$ in a storage unit which is not shown.

Then, the measurement device 1 performs the following processing based on the observation information and the environmental information including the dimension of the railway vehicle 6, the dimension of the superstructure 7, and a position $L_x$ of the observation point R, which are created in advance.

Figure 10:
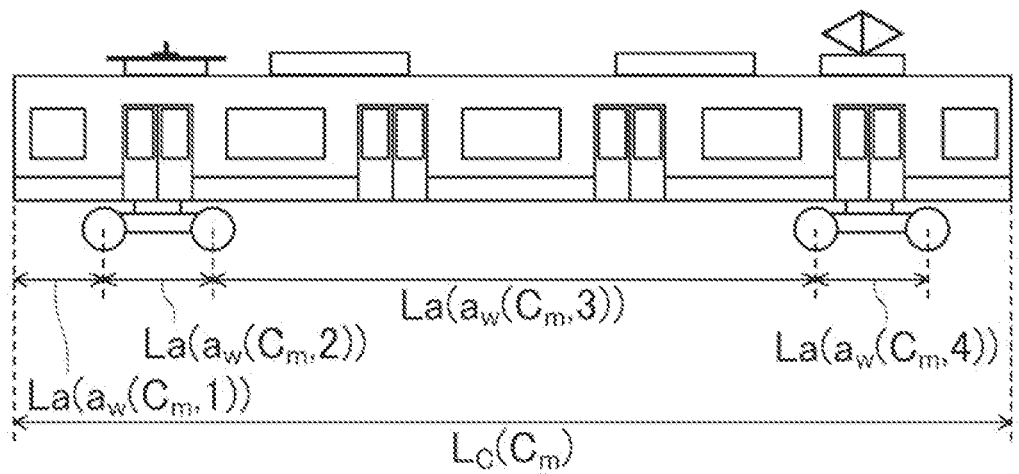
FIG. 10 is a diagram showing an example of a length $L_C(C_m)$ of a vehicle and a distance $La(a_w(C_m,n))$ between axles.

The position $L_x$ of the observation point R is a distance from the entry end of the superstructure 7 to the observation point R. The dimension of the superstructure 7 includes, for example, a length $L_B$ of the superstructure 7. The length $L_B$ of the superstructure 7 is a distance between the entry end and the exit end of the superstructure 7. The dimension of the railway vehicle 6 includes, for example, lengths $L_C(C_m)$ of the vehicles of the railway vehicle 6, the number of axles $a_T(C_m)$ of each vehicle, and a distance $L_a(a_w(C_m,n))$ between axles of each vehicle. $C_m$ is a vehicle number. The length $L_C(C_m)$ of each vehicle is a distance between two ends of a $C_m$-th vehicle from the leading vehicle. The number of axles $a_T(C_m)$ of each vehicle is the number of axles of the $C_m$-th vehicle from the leading vehicle. n is an axle number of each vehicle, and $1 \leq n \leq a_T(C_m)$. The distance $L_a(a_w(C_m,n))$ between axles of each vehicle is a distance between a front end of the $C_m$-th vehicle from the leading vehicle and a first axle from the leading vehicle when n=1, and is a distance between the (n−1)-th axle from the leading vehicle and the n-th axle when n≥2. FIG. 10 shows an example of the length $L_C(C_m)$ of the $C_m$-th vehicle of the railway vehicle 6 and the distance $L_a(a_w(C_m,n))$ between the axles. The dimension of the railway vehicle 6 and the dimension of the superstructure 7 can be measured by a known method. A database of the dimension of the railway vehicle 6 passing through the bridge 5 may be created in advance, and the dimension of a corresponding vehicle may be referred to according to a passing time point.

When it is assumed that the railway vehicle 6 in which any number of vehicles having the same dimensions are coupled to each other travels on the superstructure 7 of the bridge 5, the environmental information may include, for one of the vehicles, the length $L_C(C_m)$ of the vehicle, the number of axles $a_T(C_m)$ of the vehicle, and the distance $L_a(a_w(C_m,n))$ between the axles.

The total number of axles $Ta_T$ of the railway vehicle 6 is calculated according to Equation (8) using the number of vehicles $C_T$ included in the observation information and the number of axles $a_T(C_m)$ of each vehicle included in the environmental information.

$$Ta_T = \sum_{C_m=1}^{C_T} a_T(C_m) \tag{8}$$

A distance $D_{wa}(a_w(C_m,n))$ from the leading axle to the n-th axle of the $C_m$-th vehicle of the railway vehicle 6 is calculated according to Equation (9) using the length $L_C(C_m)$ of each vehicle, the number of axles $a_T(C_m)$ of each vehicle, and the distance $L_a(a_w(C_m,n))$ between axles of each vehicle included in the environmental information. In Equation (9), $$L_C(C_m) = L_C(1). \tag{9}$$

$$D_{wa}(a_w(C_m, n)) = \sum_{y=1}^{C_m} L_C(y) + \sum_{x=1}^{n} La(a_w(C_m, x)) - \{L_C(1) + La(a_w(1, 1))\}$$

The measurement device 1 calculates a distance $D_{wa}(a_w(C_T, a_T(C_T)))$ from the leading axle to the rearmost axle the rearmost vehicle of the railway vehicle 6 according to Equation (10) in which $C_m=C_T$ and $n=a_T(C_T)$ in Equation (9).

$$D_{wa}(a_w(C_T, a_T(C_T))) = \tag{10}$$

$$\sum_{y=1}^{C_T} L_C(y) + \sum_{x=1}^{a_T(C_T)} La(a_w(C_T, x)) - \{L_C(1) + La(a_w(1, 1))\}$$

An average speed $V_{avg}$ of the railway vehicle 6 is calculated according to Equation (11) using the length $L_B$ of the superstructure 7 included in the environmental information, the passing time $t_s$ included in the observation information, and the calculated distance $D_{wa}(a_w(C_T, a_T(C_T)))$.

$$v_{avg} = \frac{L_R}{t_s} + \frac{D_{wa}(a_w(C_T, a_T(C_T)))}{t_s} \tag{11}$$

The measurement device 1 calculates the average speed $V_{avg}$ of the railway vehicle 6 according to Equation (12) obtained by substituting Equation (10) into Equation (11).

$$v_{avg} = \tag{12}$$

$$\frac{L_B}{t_s} + \frac{1}{t_s} \left[ \sum_{y=1}^{C_T} L_C(y) + \sum_{x=1}^{a_T(C_T)} La(a_w(C_T, x)) - \{L_C(1) + La(a_w(1, 1))\} \right]$$

Next, the measurement device 1 calculates a deflection amount of the superstructure 7 caused by the traveling of the railway vehicle 6 in the following manner.

Figure 11:
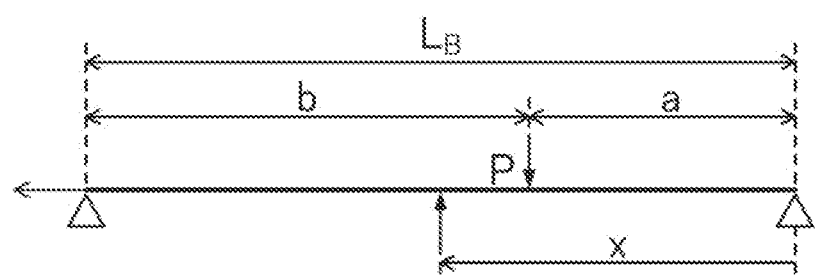
FIG. 11 is an explanatory diagram of a structural model of a superstructure of a bridge.

In the present embodiment, in the superstructure 7 of the bridge 5, considering that one or more bridge floors 7a implemented by the floor plate F, the main girder G, and the like are continuously disposed, the measurement device 1 calculates the displacement of one bridge floor 7a as the displacement at the central portion in the longitudinal direction. The load applied to the superstructure 7 moves from one end to the other end of the superstructure 7. In this case, the deflection amount, which is the displacement at the central portion of the superstructure 7, can be represented by the position of the load on the superstructure 7 and a load amount. In the present embodiment, in order to represent the deflection deformation when the axles of the railway vehicle 6 moves on the superstructure 7 as a trajectory of the deflection amount due to the movement on the bridge under one-point load, a structure model shown in FIG. 11 is considered, and the deflection amount at the central portion is calculated in the structure model. In FIG. 11, P is a load. a is a load position from the entry end of the superstructure 7 on a side where the railway vehicle 6 enters. b is a load position from the exit end of the superstructure 7 on a side where the railway vehicle 6 exits. $L_B$ is a length of the superstructure 7, that is, the distance between two ends of the superstructure 7. The structure model shown in FIG. 11 is a simple beam in which two ends are supported with the two ends as fulcrums. The simple beam may be, for example, a Bernoulli ionler beam or a temoschenco beam.

In the structure model shown in FIG. 11, when the position at the entry end of the superstructure 7 is zero and a deflection amount observation position is x, a bending moment M of the simple beam is represented by Equation (13).

$$M = \frac{b}{L_B} Px - PH_a(x - a) \tag{13}$$

In Equation (13), a function Ha is defined as in Equation (14).

$$H_a = \begin{cases} 0 & (\text{if } x \leq a) \\ 1 & (\text{if } x > a) \end{cases} \tag{14}$$

Equation (15) is obtained by transforming Equation (13).

$$-\frac{ML_B}{P} = -bx + H_a L_B(x-a) \quad (15)$$

Meanwhile, the bending moment M is represented by Equation (16). In Equation (16), θ is an angle, I is a secondary moment, and E is a Young's modulus.

$$-M = EI\frac{d\theta}{dx} \quad (16)$$

Equation (17) is obtained by substituting Equation (16) into Equation (15).

$$\frac{EIL_B}{P}\frac{d\theta}{dx} = -bx + H_a L_B(x-a) \quad (17)$$

Equation (18) for integrating Equation (17) with respect to the observation position x is calculated, and Equation (19) is obtained. In Equation (19), $C_1$ is an integral constant.

$$\int \frac{EIL_B}{P}\frac{d\theta}{dx}dx = \int(-bx + H_a L_B(x-a))dx \quad (18)$$

$$\frac{EIL_B}{P}\theta = -\frac{bx^2}{2} + H_a\frac{L_B(x-a)^2}{2} + C_1 \quad (19)$$

Further, Equation (20) for integrating Equation (19) with respect to the observation position x is calculated, and Equation (21) is obtained. In Equation (21), $C_2$ is an integral constant.

$$\int \frac{EIL_B}{P}\theta\, dx = \int \left\{-\frac{bx^2}{2} + H_a\frac{L_B(x-a)^2}{2} + C_1\right\}dx \quad (20)$$

$$\frac{EIL_B}{P}\theta x = -\frac{bx^3}{6} + H_a\frac{L_B(x-a)^3}{6} + C_1 x + C_2 \quad (21)$$

In Equation (21), ex represents the deflection amount, and Equation (22) is obtained by replacing ex with a deflection amount w.

$$\frac{EIL_B}{P}w = -\frac{bx^3}{6} + H_a\frac{L_B(x-a)^3}{6} + C_1 x + C_2 \quad (22)$$

As shown in FIG. 11, since $b=L_B-a$, Equation (22) is transformed as in Equation (23).

$$\frac{EIL_B}{P}w = -\frac{(L_B-a)x^3}{6} + H_a\frac{L_B(x-a)^3}{6} + C_1 x + C_2 \quad (23)$$

When x=0 and the deflection amount w=0, $H_a=0$ from x≤a. Therefore, when x=w=$H_a$=0 is substituted into Equation (23), Equation (24) is obtained.

$$C_2 = 0 \quad (24)$$

When x=$L_B$ and the deflection amount w=0, $H_a$=1 from x>a. Therefore, when x=$L_B$, w=0, and $H_a$=1 are substituted into Equation (23) and rearranged, Equation (25) is obtained.

$$C_1 = \frac{a(L_B-a)(a+2(L_B-a))}{6} \quad (25)$$

By substituting b=$L_B$—a into Equation (25), Equation (26) is obtained.

$$C_1 = \frac{ab(a+2b)}{6} \quad (26)$$

Equation (27) is obtained by substituting an integral constant $C_2$ in Equation (24) and an integral constant $C_1$ in Equation (26) into Equation (23).

$$\frac{EIL_B}{P}w = -\frac{bx^3}{6} + H_a\frac{L_B(x-a)^3}{6} + \frac{ab(a+2b)}{6}x \quad (27)$$

Equation (27) is transformed, and the deflection amount w at the observation position x when a load P is applied to the position a is represented by Equation (28).

$$w = \frac{P}{6EIL_B}\{-bx^3 + H_a L_B(x-a)^3 + ab(a+2b)x\} \quad (28)$$

A deflection amount $w_{0.5L_B}$ at the observation position x at the center when the load P is at the center of the superstructure 7 is represented by Equation (29), where x=0.5 $L_B$, a=b=0.5 $L_B$, and $H_a$=0. The deflection amount $w_{0.5L_B}$ is a maximum amplitude of the deflection amount w.

$$w_{0.5L_B} = \frac{P}{48EI}L_B^3 \quad (29)$$

The deflection amount w at any observation position x is normalized by the deflection amount $w_{0.5L_B}$. When a position a of the load P is on an entry end side of the observation position x, from x>a, Equation (30) is obtained by substituting $H_a$=1 into Equation (29).

$$w = \frac{P}{6EIL_B}\{-bx^3 + L_B(x-a)^3 + ab(a+2b)x\} \quad (30)$$

When the position a of the load P is represented by a=$L_B$r, and a=$L_B$r, b=$L_B$(1−r) are substituted into Equation (30) and rearranged, a deflection amount $w_{std}$ in which the deflection amount w is normalized is obtained according to Equation (31). r represents a ratio of the position a of the load P to the length $L_B$ of the superstructure 7.

$$w_{std} = \frac{8}{L_B}\left\{xr^3 + \left(\frac{x^3}{L_B^2} + 2x\right)r\right\} - \frac{8}{L_B}\left(L_B r^3 + \frac{3x^2}{L_B}r\right) \quad (31)$$

Similarly, when the position a of the load P is closer to an exit end side of the observation position x, from x≤a, Equation (32) is obtained by substituting $H_a$=0 into Equation (29).

$$w = \frac{P}{6EIL_B}\{-bx^3 + ab(L_B+b)x\} \quad (32)$$

When the position a of the load P is represented by $a=L_B r$, and $a=L_B r$ and $b=L_B(1-r)$ are substituted into Equation (32) and rearranged, the deflection amount $w_{std}$ in which the deflection amount w is normalized is obtained according to Equation (33).

$$w_{std} = \frac{8}{L_B}\left\{xr^3 + \left(\frac{x^3}{L_B^2} + 2x\right)r\right\} - \frac{8}{L_B}\left(3xr^2 + \frac{x^3}{L_B^2}\right) \quad (33)$$

Equation (31) and Equation (33) are combined, and a deflection amount $w_{std}(r)$ at any observation position $x=L_x$ is represented by Equation (34). In Equation (34), a function R(r) is represented by Equation (35). Equation (34) is an approximate expression of the deflection of the superstructure 7 which is a structure, and is an equation based on the structure model of the superstructure 7. Specifically, Equation (34) is an approximate expression normalized by the maximum amplitude of the deflection at the center position between the entry end and the exit end of the superstructure 7.

$$w_{std}(r) = \frac{8}{L_B}\left\{L_x r^3 + \left(\frac{L_x^3}{L_B^2} + 2L_x\right)r - R(r)\right\} \quad (34)$$

$$R(r) = \begin{cases} L_B r^3 + \dfrac{3L_x^2}{L_B}r & (\text{if } L_x > L_B r) \\ 3L_x r^2 + \dfrac{L_x^3}{L_B^2} & (\text{if } L_x \le L_B r) \end{cases} \quad (35)$$

In the present embodiment, the load P is a load of any axle of the railway vehicle 6. A time $t_{xn}$ required for any axle of the railway vehicle 6 to reach the position $L_x$ of the observation point R from the entry end of the superstructure 7 is calculated according to Equation (36) using the average speed $v_{avg}$ calculated according to Equation (11).

$$t_{xn} = \frac{L_x}{v_{avg}} \quad (36)$$

A time tin required for any axle of the railway vehicle 6 to pass through the superstructure 7 having the length $L_B$ is calculated according to Equation (37).

$$t_{ln} = \frac{L_B}{v_{avg}} \quad (37)$$

A time point $t_0(C_m,n)$ at which the n-th axle of the $C_m$-th vehicle of the railway vehicle 6 reaches the entry end of the superstructure 7 is calculated according to Equation (38) using the entry time point $t_i$ included in the observation information, the distance $D_{wa}(a_w(C_m,n))$ calculated according to Equation (9), and the average speed $v_{avg}$ calculated according to Equation (11).

$$t_0(C_m,n) = t_i + \frac{1}{v_{avg}}D_{wa}(a_w(C_m,n)) \quad (38)$$

Figure 12:
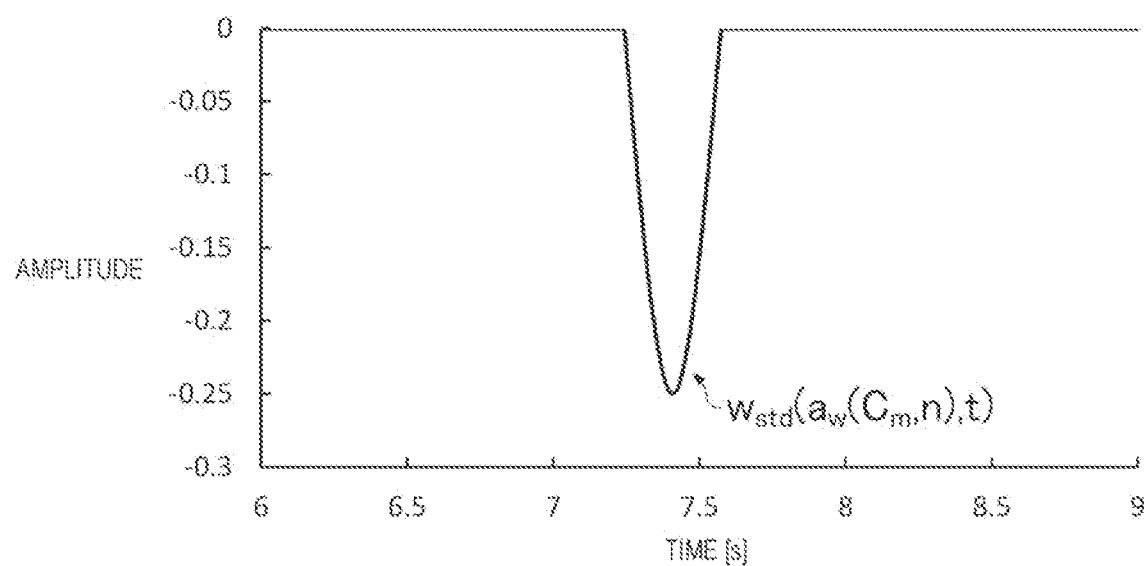
FIG. 12 is a diagram showing an example of a deflection amount $w_{std}(a_w(C_m,n),t)$.

Using Equation (36), Equation (37), and Equation (38), the measurement device 1 calculates, according to Equation (39), a deflection amount $w_{std}(a_w(C_m,n),t)$ obtained by replacing the deflection amount $w_{std}(r)$ represented by Equation (34) by the n-th axle of the $C_m$-th vehicle with time. In Equation (39), a function R(t) is represented by Equation (40). FIG. 12 shows an example of the deflection amount $w_{std}(a_w(C_m,n),t)$.

$$w_{std}(a_w(C_m,n),t) = \begin{cases} 0 & \text{if } (t < t_0(C_m,n)) \\ \dfrac{8}{t_{ln}}\left\{t_{xn}\left(\dfrac{t-t_0(C_m,n)}{t_{ln}}\right)^3 + \left(\dfrac{t_{xn}^3}{t_{ln}^2} + 2t_{xn}\right)\left(\dfrac{t-t_0(C_m,n)}{t_{ln}}\right) - R(t)\right\} & \text{if } (t_0(C_m,n) \le t \le t_0(C_m,n) + t_{ln}) \\ 0 & \text{if } (t_0(C_m,n) + t_{ln} < t) \end{cases} \quad (39)$$

$$R(t) = \begin{cases} 0 & \text{if } (t < t_0(C_m,n)) \\ t_{ln}\left(\dfrac{t-t_0(C_m,n)}{t_{ln}}\right)^3 + \dfrac{3t_{xn}^2}{t_{ln}}\left(\dfrac{t-t_0(C_m,n)}{t_{ln}}\right) & \text{if } (t_0(C_m,n) \le t \le t_0(C_m,n) + t_{ln} \cap t_{xn} > t - t_0(C_m,n)) \\ 3t_{xn}\left(\dfrac{t-t_0(C_m,n)}{t_{ln}}\right)^2 + \dfrac{t_{xn}^3}{t_{ln}^2} & \text{if } (t_0(C_m,n) \le t \le t_0(C_m,n) + t_{ln} \cap t_{xn} \le t - t_0(C_m,n)) \\ 0 & \text{if } (t_0(C_m,n) + t_{ln} < t) \end{cases} \quad (40)$$

Figure 13:
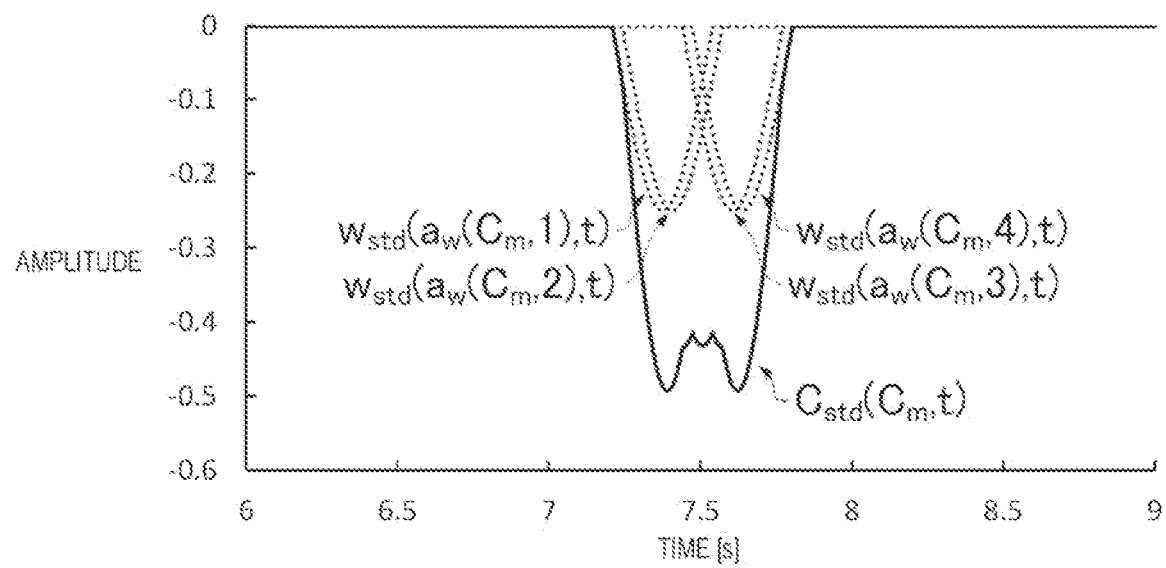
FIG. 13 is a diagram showing an example of a deflection amount $C_{std}(C_m,t)$.

The measurement device 1 calculates a deflection amount $C_{std}(C_m,t)$ caused by the $C_m$-th vehicle according to Equation (41). FIG. 13 shows an example of the deflection amount $C_{std}(C_m,t)$ caused by the $C_m$-th vehicle with the number of axles n=4.

$$C_{std}(C_m,t) = \sum_{n=1}^{a_T(C_m)} w_{std}(a_w(C_m,n),t) \quad (41)$$

Figure 14:
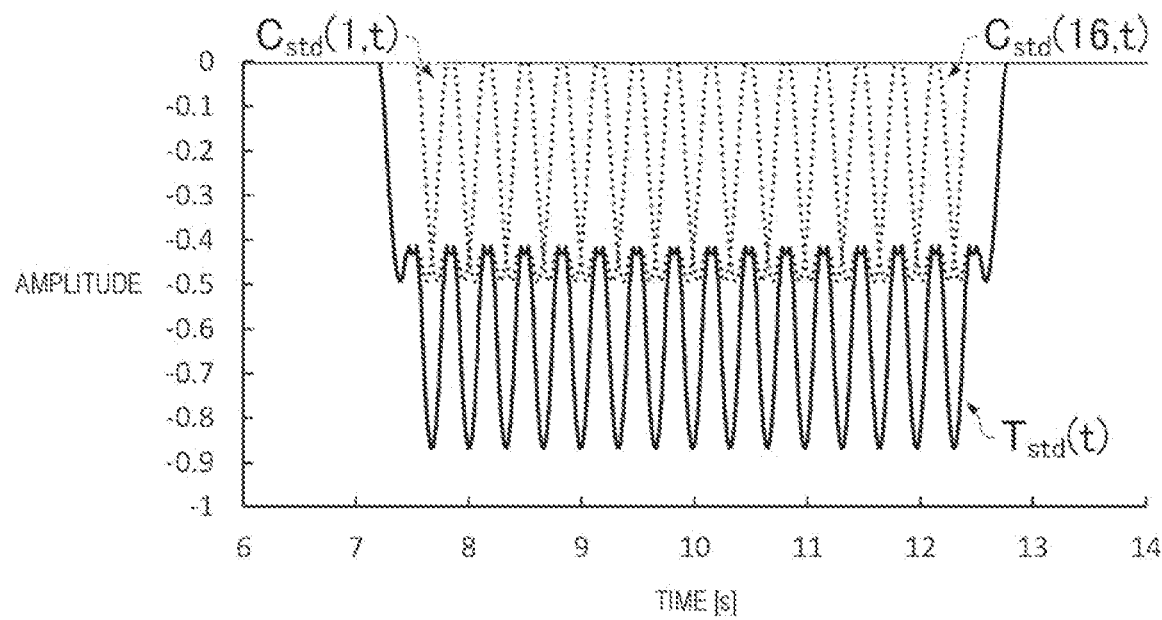
FIG. 14 is a diagram showing an example of a deflection amount $T_{std}(t)$.

The measurement device 1 further calculates a deflection amount $T_{std}(t)$ caused by the railway vehicle 6 according to Equation (42). FIG. 14 shows an example of the deflection amount $T_{std}(t)$ caused by the railway vehicle 6 with the number of vehicles $C_T=16$. In FIG. 14, a broken line indicates 16 deflection amounts $C_{std}(1,t)$ to $C_{std}(16,t)$.

$$T_{std}(t) = \sum_{C_m=1}^{C_T} C_{std}(C_m,t) \quad (42)$$

Figure 15:
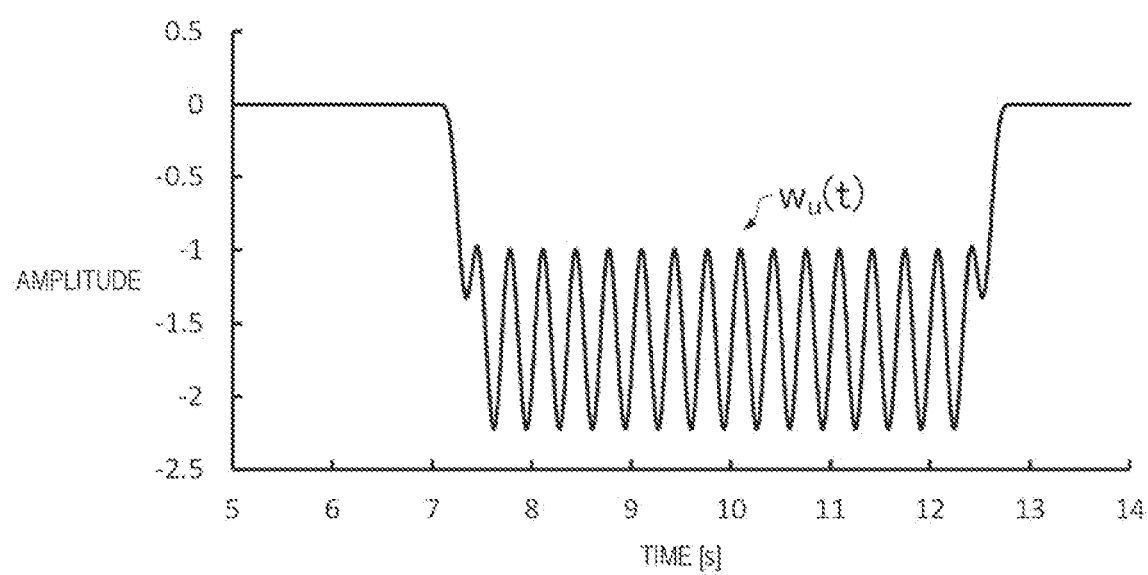
FIG. 15 is a diagram showing an example of a displacement $w_u(t)$.

Since the deflection amount $T_{std}(t)$ is normalized by the amplitude at the center of the superstructure 7, the measurement device 1 multiplies the deflection amount $T_{std}(t)$ by the applied load P as a weighting value of the amplitude with respect to the applied load, and further performs the same low-pass filter processing as that of the previously described Equation (1) to calculate the displacement $w_u(t)$ as static deflection of the simple beam supporting both ends, as in Equation (43). FIG. 15 is a diagram showing an example of the displacement $w_u(t)$.

$$w_u(t) = f_{LPF}(P \times T_{std}(t)) \quad (43)$$

Next, the measurement device 1 differentiates the displacement $w_u(t)$ to calculate a speed $w_v(t)$ as in Equation (44).

$$w_v(t) = \frac{d}{dt} w_u(t) \quad (44)$$

Next, the measurement device 1 calculates a speed vibration component $s_v(t)$ by performing the high-pass filter processing on the speed $w_v(t)$, as in Equation (45).

$$s_v(t) = f_{HPF}(w_v(t)) \quad (45)$$

Figure 16:
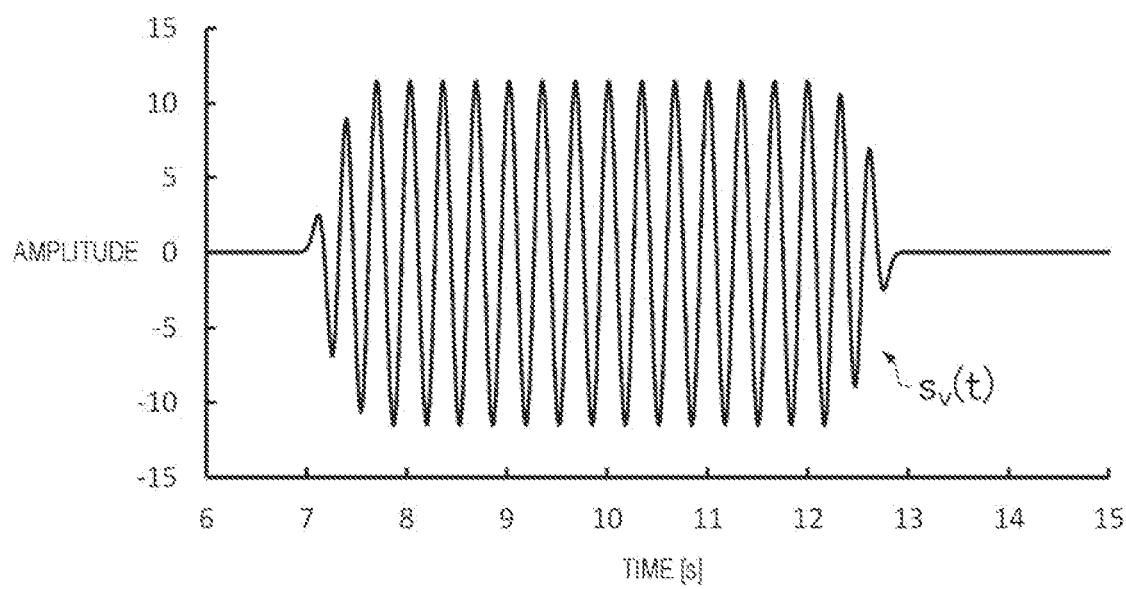
FIG. 16 is a diagram showing an example of a speed vibration component $s_v(t)$.

The high-pass filter processing in Equation (45) is performed as in Equation (46), for example, with a moving average interval being set from $t-t_p$ to $t+t_p$. A time $t_p$ in Equation (46) is obtained by Equation (47) by converting $T/2\Delta T$ into an integer by a floor function, where T is a vibration period of the displacement $w_u(t)$ and $\Delta T$ is data time resolution. FIG. 16 shows an example of the speed vibration component $s_v(t)$ obtained by performing the high-pass filter processing on the speed $w_v(t)$ obtained by differentiating the displacement $w_u(t)$ in FIG. 15. The measurement device 1 may calculate the speed vibration component $s_v(t)$ by performing band-pass filter processing on the speed $w_v(t)$.

$$s_v(t) = w_v(t) - \sum_{k=t-t_p}^{t+t_p} w_v(k) \quad (46)$$

$$t_p = \left( \left\lfloor \frac{T}{2\Delta T} \right\rfloor + 1 \right) \times \Delta T \quad (47)$$

Figure 17:
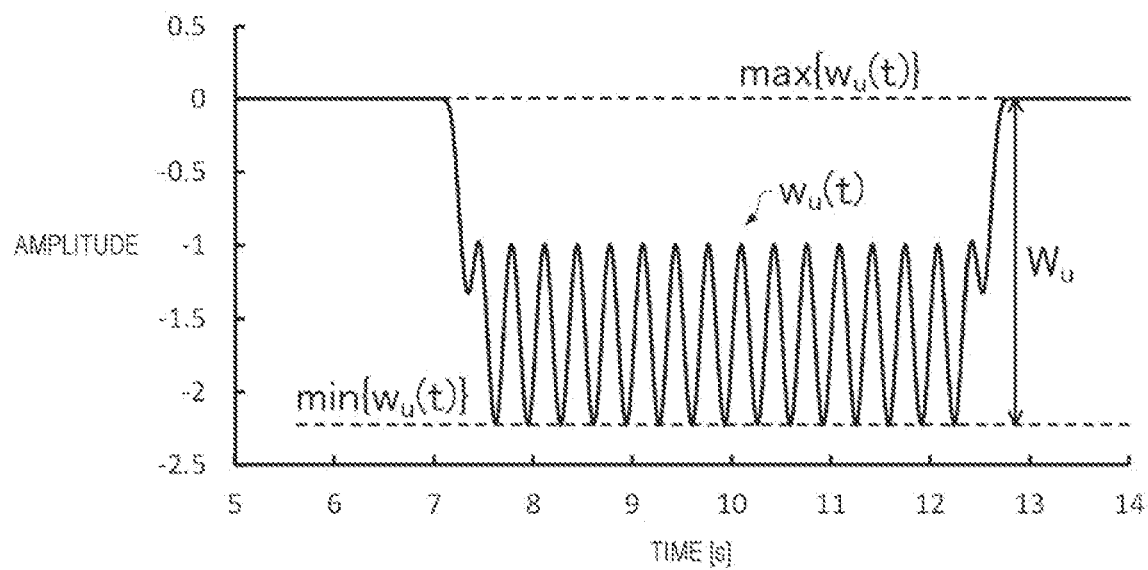
FIG. 17 is a diagram showing an example of a displacement amplitude $W_u$.

Next, the measurement device 1 calculates a difference between a maximum value $\max\{w_u(t)\}$ and a minimum value $\min\{w_u(t)\}$ of the displacement $w_u(t)$ as the displacement amplitude $W_u$, as in Equation (48). FIG. 17 shows an example of the displacement amplitude $W_u$ calculated from the displacement $w_u(t)$ in FIG. 5.

$$W_u = \max\{w_u(t)\} - \min\{w_u(t)\} \quad (48)$$

Figure 18:
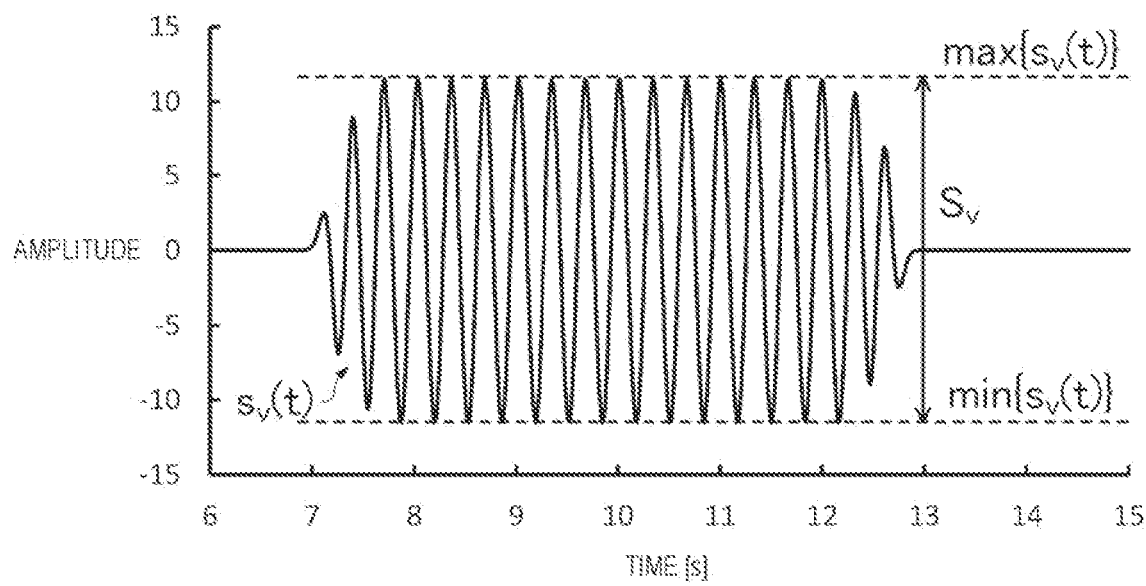
FIG. 18 is a diagram showing an example of a speed amplitude $S_v$.

The measurement device 1 calculates a difference between a maximum value $\max\{s_v(t)\}$ and a minimum value $\min\{s_v(t)\}$ of the speed vibration component $s_v(t)$ as a speed amplitude $S_v$, as in Equation (49). FIG. 18 shows an example of the speed amplitude $S_v$ calculated from the speed vibration component $s_v(t)$ in FIG. 16.

$$S_v = \max\{s_v(t)\} - \min\{s_v(t)\} \quad (49)$$

Then, the measurement device 1 calculates the conversion function $f_{conv}$ using the displacement amplitude $W_u$ and the speed amplitude S. For example, the measurement device 1 calculates a ratio between the displacement amplitude $W_u$ and the speed amplitude $S_v$ as a linear coefficient $R_{uv}$ of the conversion function $f_{conv}$ by using the conversion function $f_{conv}$ as a linear function and using Equation (50). For example, it is assumed that a zero-order coefficient of the conversion function $f_{conv}$ is 0.

$$R_{uv} = \frac{W_u}{S_v} \quad (50)$$

Next, the measurement device 1 integrates the acceleration $\alpha_{lp}(t)$ obtained by performing the low-pass filter processing on the acceleration $\alpha_a(t)$ according to the previously described Equation (1) to calculate the integral speed $v_a(t)$. The measurement device 1 sets a time point at a time point t=0 as a bias correction time point, and integrates the subsequent acceleration $\alpha_{lp}(t)$ to calculate the integral speed $v_{a\_lp}(t)$, as in Equation (51).

$$v_{a\_lp}(t) = \int_0^t \{\alpha_{lp}(t) - \alpha_{lp}(0)\} dt \quad (51)$$

Next, the measurement device 1 performs the high-pass filter processing on the integral speed $v_{a\_lp}(t)$ to calculate a speed vibration component $s_{av}(t)$, as in Equation (52). The measurement device 1 may calculate the speed vibration component $s_{av}(t)$ by performing the band-pass filter processing on the integral speed $v_{a\_lp}(t)$.

$$s_{av}(t) = f_{HPF}(v_{a\_lp}(t)) \quad (52)$$

Figure 19:
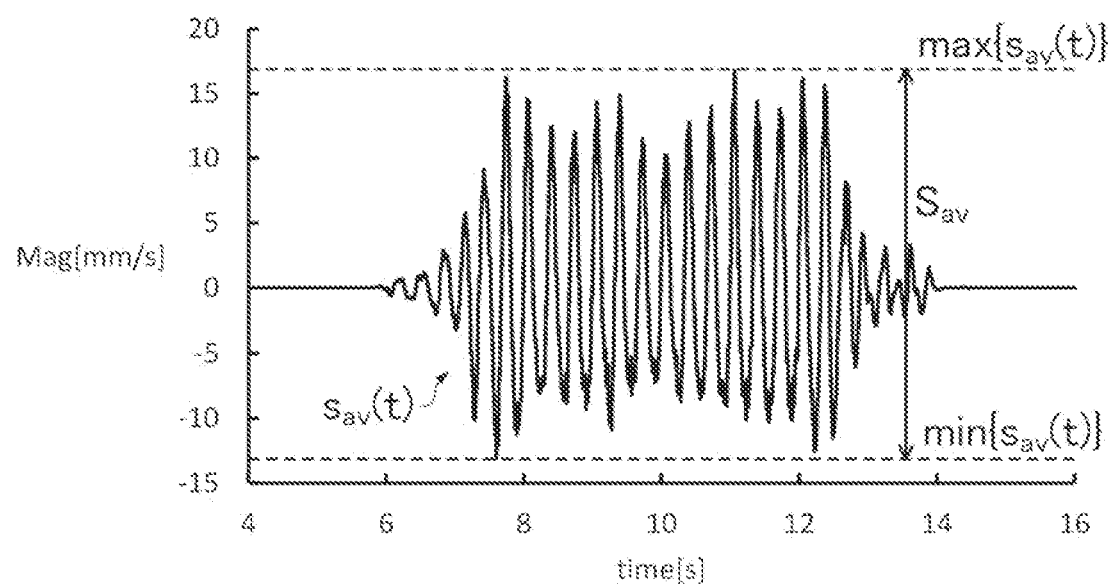
FIG. 19 is a diagram showing an example of a speed vibration component $s_{av}(t)$ and a speed amplitude $S_{av}$.

Next, the measurement device 1 calculates a difference between a maximum value $\max\{s_{av}(t)\}$ and a minimum value $\min\{s_{av}(t)\}$ of the speed vibration component $s_{av}(t)$ as a speed amplitude $S_{av}$, as in Equation (53). FIG. 19 shows an example of the speed vibration component $s_{av}(t)$ and the speed amplitude $S_{av}$ calculated based on the speed vibration component $s_{av}(t)$.

$$S_{av} = \max\{s_{av}(t)\} - \min\{s_{av}(t)\} \quad (53)$$

Then, the measurement device 1 estimates a displacement amplitude $w_{est}(t)$ of the superstructure 7 when the railway vehicle 6 passes through the superstructure 7 of the bridge 5 by using the speed amplitude $S_{av}$ and the conversion function $f_{conv}$ as in Equation (54).

$$w_{est}(t) = f_{conv}(S_{av}) = R_{uv} S_{av} \quad (54)$$

1-3. Procedure of Measurement Method

Figure 20:
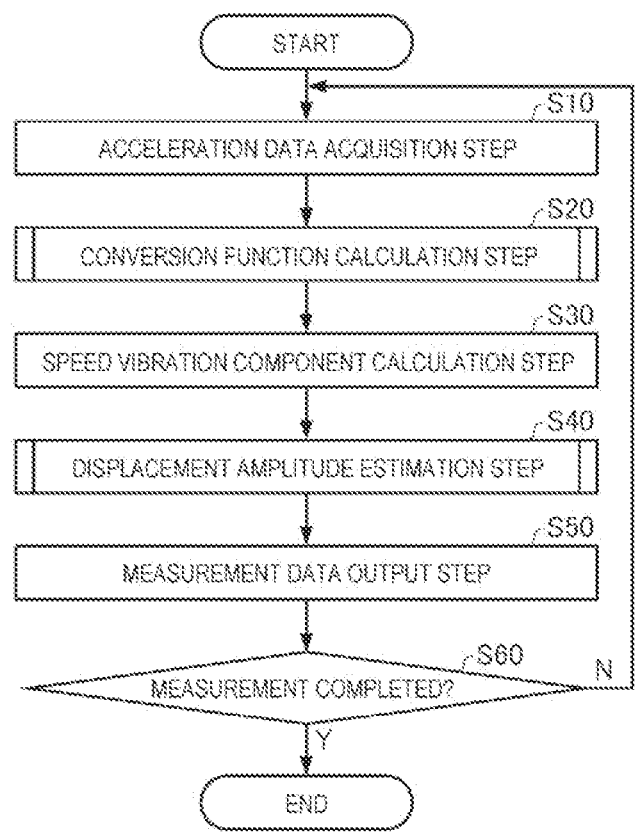
FIG. 20 is a flowchart showing an example of a procedure of a measurement method according to a first embodiment.

FIG. 20 is a flowchart showing an example of a procedure of a measurement method according to a first embodiment. In the present embodiment, the measurement device 1 of the measurement system 10 executes a procedure shown in FIG. 20.

As shown in FIG. 20, first, in an acceleration data acquisition step S10, the measurement device 1 acquires acceleration data output from the accelerometer 2 that observes the observation point R on the superstructure 7 when the railway vehicle 6 moves on the superstructure 7 of the bridge 5.

Next, in a conversion function calculation step S20, the measurement device 1 calculates the conversion function $f_{conv}$ based on the acceleration data acquired in the step S10, the approximate expression of the deflection of the superstructure 7, and the environmental information created in advance. An example of the procedure of the conversion function calculation step S20 will be described later.

Next, in a speed vibration component calculation step S30, the measurement device 1 calculates, based on the acceleration data acquired in the step S10, the speed vibration component $s_{av}(t)$ by performing integration processing and filter processing on the acceleration $\alpha_{lp}(t)$, as in the previously described Equations (51) and (52). For example, the filter processing may be high-pass filter processing or band-pass filter processing. The speed vibration component $s_{av}(t)$ is an example of a first speed vibration component.

Next, in a displacement amplitude estimation step S40, the measurement device 1 estimates, based on the speed vibration component $s_{av}(t)$ calculated in the step S30 and the conversion function $f_{conv}$ calculated in advance in the step S20, as in the previously described Equations (53) and (54), the displacement amplitude $w_{est}(t)$, which is the displacement amplitude of the superstructure 7 when the railway vehicle 6 moves on the superstructure 7 of the bridge 5. An example of the procedure of the displacement amplitude estimation step S40 will be described later.

Next, in a measurement data output step S50, the measurement device 1 outputs the measurement data including the displacement amplitude $w_{est}(t)$ calculated in the step S40 to the monitoring device 3. Specifically, the measurement device 1 transmits the measurement data to the monitoring device 3 via the communication network 4. The measurement data may include the speed vibration component $s_{av}(t)$, the speed amplitude $S_{av}$, and the like in addition to the displacement amplitude $w_{est}(t)$.

Then, the measurement device 1 repeatedly performs processing from the steps S10 to S50 until the measurement is completed in step S60.

The measurement device 1 may perform the step S30 before the step S20.

Figure 21:
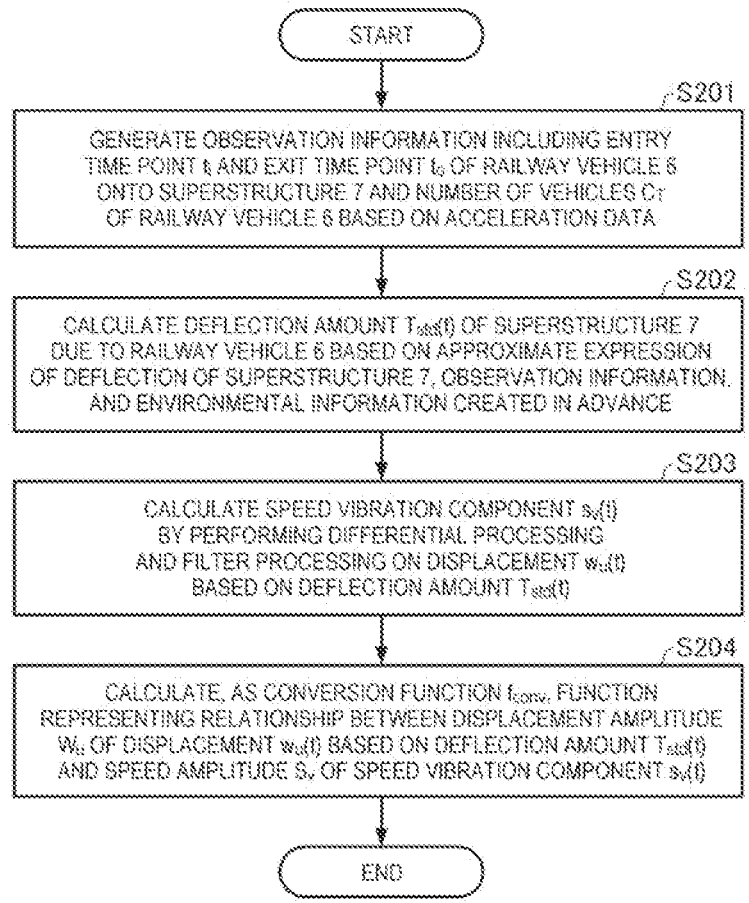
FIG. 21 is a flowchart showing an example of a procedure of a conversion function calculation step in the first embodiment.

FIG. 21 is a flowchart showing an example of the procedure of the conversion function calculation step S20 in FIG. 20.

As shown in FIG. 21, first, in step S201, the measurement device 1 generates, based on the acceleration data acquired in the acceleration data acquisition step S10 in FIG. 20, the observation information including the entry time point $t_i$ and the exit time point $t_o$ of the railway vehicle 6 with respect to the superstructure 7 and the number of vehicles $C_T$ of the railway vehicle 6. Specifically, the measurement device 1 calculates the speed $v_{ma}(t)$ from the acceleration $\alpha_{lp}(t)$ based on the acceleration data according to the previously described Equations (1) to (5), calculates a time point at a minimum peak of falling of a value range in which the speed $v_{ma}(t)$ has a negative value as the entry time point $t_i$, and calculates a time point at a maximum peak of rising of a value range in which the speed $v_{ma}(t)$ has a positive value as the exit time point $t_o$. The measurement device 1 calculates the fundamental frequency $F_f$ of the acceleration $\alpha_{lp}(t)$ based on the acceleration data, calculates the passing time $t_s$ from the entry time point $t_i$ and the exit time point $t_o$ according to the previously described Equation (6), and calculates the number of vehicles $C_T$ from the fundamental frequency $F_f$ and the passing time $t_s$ according to the previously described Equation (7).

Next, in step S202, the measurement device 1 calculates the deflection amount $T_{std}(t)$ of the superstructure 7 due to the railway vehicle 6 based on the approximate expression of the deflection of the superstructure 7, which is the previously described Equation (34), the observation information generated in the step S201, and the environmental information created in advance. Specifically, the measurement device 1 calculates the deflection amount $T_{std}(t)$ according to the previously described Equations (9) to (42).

Next, in step S203, the measurement device 1 calculates the speed vibration component $s_v(t)$ by performing the differential processing and the filter processing on the displacement $w_u(t)$ based on the deflection amount $T_{std}(t)$ calculated in the step S202, as in the previously described Equations (43), (44), and (45). The speed vibration component $s_v(t)$ is an example of a second speed vibration component.

Finally, in step S204, the measurement device 1 calculates, as the conversion function $f_{conv}$, a function representing the relationship between the displacement amplitude $W_u$, which is the amplitude of the displacement $w_u(t)$ based on the deflection amount $T_{std}(t)$ calculated in step S202, and the speed amplitude $S_v$, which is the amplitude of the speed vibration component $s_v(t)$ calculated in the step S203, as in the previously described Equations (48), (49), and (50). The displacement amplitude $W_u$ is a difference between the maximum value $\max\{w_u(t)\}$ and the minimum value $\min\{w_u(t)\}$ of the displacement $w_u(t)$. The speed amplitude $S_v$ is a difference between the maximum value $\max\{s_v(t)\}$ and the minimum value $\min\{s_v(t)\}$ of the speed vibration component $s_v(t)$.

Figure 22:
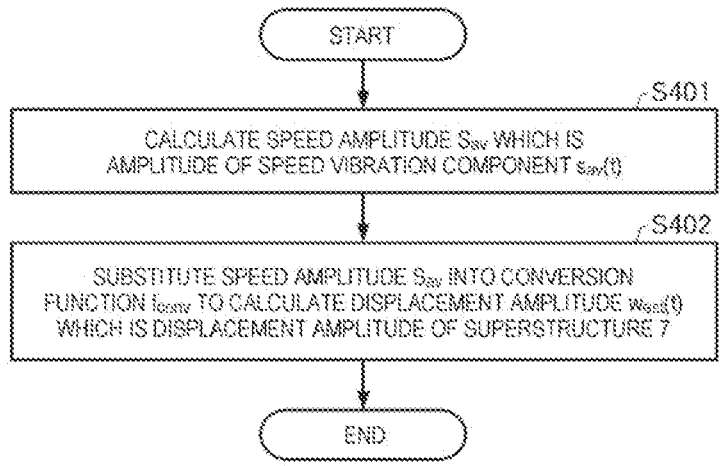
FIG. 22 is a flowchart showing an example of a procedure of a displacement amplitude estimation step in the first embodiment.

FIG. 22 is a flowchart showing an example of the procedure of the displacement amplitude estimation step S40 in FIG. 21.

As shown in FIG. 22, first, in step S401, the measurement device 1 calculates the speed amplitude $S_{av}$, which is the amplitude of the speed vibration component $s_{av}(t)$, as in the previously described Equation (53). The speed amplitude $S_{av}$ is a difference between the maximum value $\max\{s_{av}(t)\}$ and the minimum value $\min\{s_{av}(t)\}$ of the speed vibration component $s_{av}(t)$.

Then, in step S402, the measurement device 1 substitutes the speed amplitude $S_{av}$ calculated in the step S401 into the conversion function $f_{conv}$ to calculate the displacement amplitude $w_{est}(t)$, which is the displacement amplitude of the superstructure 7, as in the previously described Equation (54).

1-4. Configuration of Accelerometer, Measurement Device, and Monitoring Device

Figure 23:
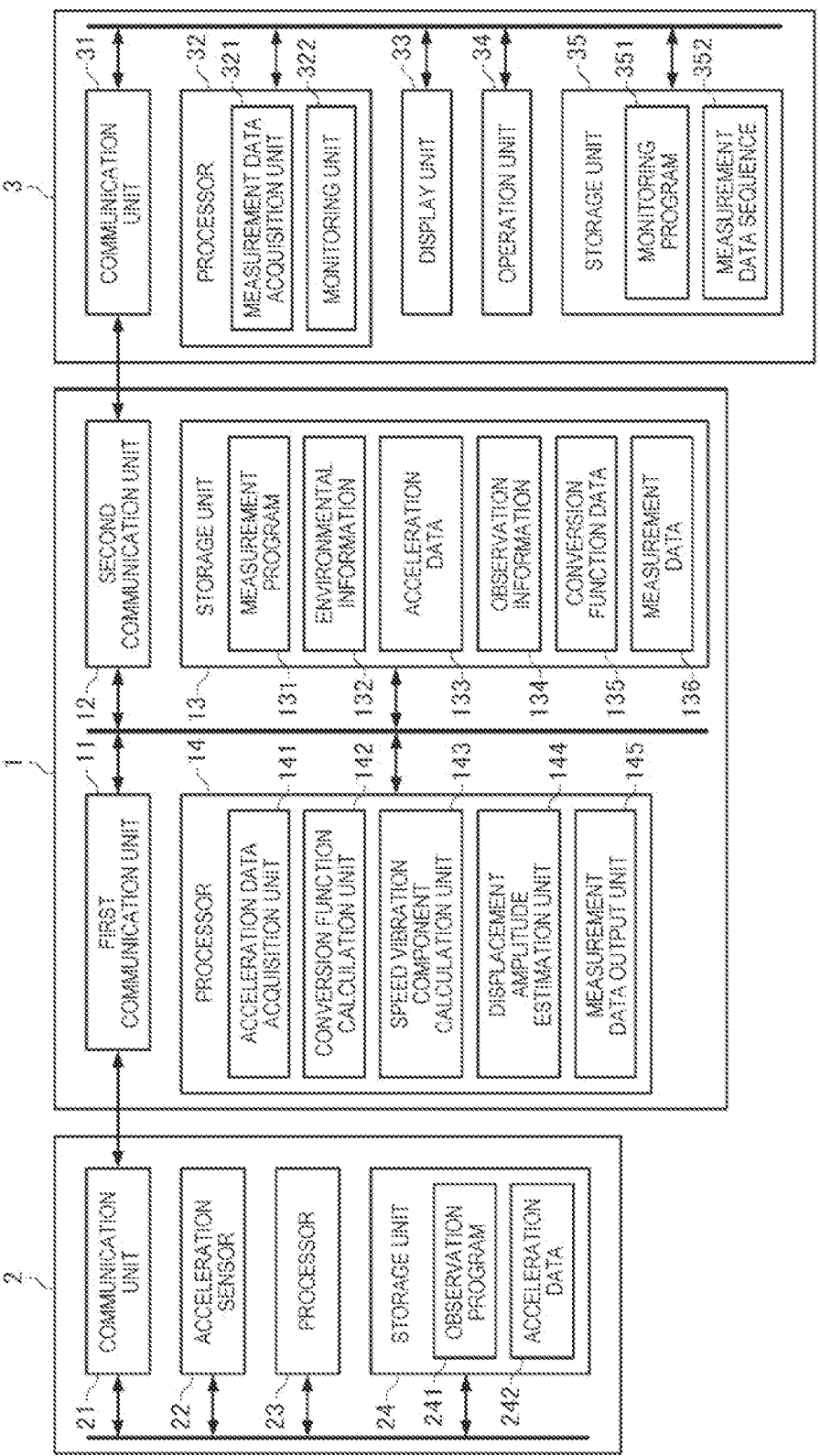
FIG. 23 is a diagram showing a configuration example of an accelerometer, a measurement device, and a monitoring device.

FIG. 23 is a diagram showing a configuration example of the accelerometer 2, the measurement device 1, and the monitoring device 3.

As shown in FIG. 23, the accelerometer 2 includes a communication unit 21, an acceleration sensor 22, a processor 23, and a storage unit 24.

The storage unit 24 is a memory that stores various programs, data, and the like for the processor 23 to perform calculation processing and control processing. The storage unit 24 stores programs, data, and the like for the processor 23 to implement predetermined application functions.

The acceleration sensor 22 detects an acceleration generated in each axial direction of the three axes.

The processor 23 controls the acceleration sensor 22 by executing an observation program 241 stored in the storage unit 24, generates acceleration data 242 based on the acceleration detected by the acceleration sensor 22, and stores the generated acceleration data 242 in the storage unit 24.

The communication unit 21 transmits the acceleration data 242 stored in the storage unit 24 to the measurement device 1 under the control of the processor 23.

As shown in FIG. 23, the measurement device 1 includes a first communication unit 11, a second communication unit 12, a storage unit 13, and a processor 14.

The first communication unit 11 receives the acceleration data 242 from the accelerometer 2, and outputs the received acceleration data 242 to the processor 14.

The storage unit 13 is a memory that stores programs, data, and the like for the processor 14 to perform the calculation processing and the control processing. The storage unit 13 stores programs, data, and the like for the processor 14 to implement predetermined application functions. The processor 14 may receive various programs, data, and the like via the communication network 4 and store the programs, data, and the like in the storage unit 13.

The processor 14 calculates the conversion function $f_{conv}$ based on the acceleration data received by the first communication unit 11, and stores the conversion function $f_{conv}$ in the storage unit 13 as conversion function data 135. The conversion function data 135 is, for example, data of each coefficient value of the conversion function $f_{conv}$.

The processor 14 also generates measurement data 136 based on the acceleration data 242 received by the first communication unit 11 and the conversion function data 135 stored in the storage unit 13, and stores the generated measurement data 136 in the storage unit 13.

In the present embodiment, the processor 14 functions as an acceleration data acquisition unit 141, a conversion function calculation unit 142, a speed vibration component calculation unit 143, a displacement amplitude estimation unit 144, and a measurement data output unit 145 by executing a measurement program 131 stored in the storage unit 13. That is, the processor 14 includes the acceleration data acquisition unit 141, the conversion function calculation unit 142, the speed vibration component calculation unit 143, the displacement amplitude estimation unit 144, and the measurement data output unit 145.

The acceleration data acquisition unit 141 acquires the acceleration data output from the accelerometer 2 when the railway vehicle 6 moves on the superstructure 7 of the bridge 5. Specifically, the acceleration data acquisition unit 141 acquires the acceleration data 242 received by the first communication unit 11, and stores the acceleration data 242 in the storage unit 13 as acceleration data 133. That is, the acceleration data acquisition unit 141 performs the processing of the acceleration data acquisition step S10 in FIG. 20.

The conversion function calculation unit 142 calculates the conversion function $f_{conv}$ based on the acceleration data acquired by the acceleration data acquisition unit 141, the approximate expression of the deflection of the superstructure 7, and environmental information 132. The environmental information 132 is created in advance and stored in the storage unit 13. Specifically, first, the conversion function calculation unit 142 generates, based on the acceleration data according to the previously described Equations (1) to (7), observation information 134 including the entry time point $t_i$ and the exit time point $t_o$ of the railway vehicle 6 with respect to the superstructure 7 and the number of vehicles $C_T$ of the railway vehicle 6, and stores the generated observation information 134 in the storage unit 13. Next, the conversion function calculation unit 142 calculates the deflection amount $T_{std}(t)$ of the superstructure 7 due to the railway vehicle 6 based on the approximate expression of the deflection of the superstructure 7, which is the previously described Equation (34), the observation information 134, and the environmental information 132. Next, the conversion function calculation unit 142 calculates the speed vibration component $s_v(t)$ by performing the differential processing and the filter processing on the displacement $w_u(t)$ based on the deflection amount $T_{std}(t)$, as in the previously described Equations (43), (44), and (45). Next, the conversion function calculation unit 142 calculates, as the conversion function $f_{conv}$, a function representing the relationship between the displacement amplitude $W_u$, which is the amplitude of the displacement $w_u(t)$ based on the calculated deflection amount $T_{std}(t)$, and the speed amplitude $S_v$, which is the amplitude of the speed vibration component $s_v(t)$, as in the previously described Equations (48), (49), and (50). Then, the conversion function calculation unit 142 stores, as the conversion function data 135, the calculated data on each coefficient value of the conversion function $f_{conv}$ in the storage unit 13. That is, the conversion function calculation unit 142 performs the processing of the conversion function calculation step S20 in FIG. 20, specifically, the processing of steps S201, S202, S203, and S204 in FIG. 21.

The speed vibration component calculation unit 143 calculates the speed vibration component $s_{av}(t)$ by performing the integration processing and the filter processing on the acceleration $\alpha_{lp}(t)$ based on the acceleration data acquired by the acceleration data acquisition unit 141. Specifically, the speed vibration component calculation unit 143 reads out the acceleration data 133 stored in the storage unit 13, and calculates the speed vibration component $s_{av}(t)$ according to the previously described Equations (51) and (52). That is, the speed vibration component calculation unit 143 performs the processing of the speed vibration component calculation step S30 in FIG. 20.

The displacement amplitude estimation unit 144 estimates, based on the speed vibration component $s_{av}(t)$ calculated by the speed vibration component calculation unit 143 and the conversion function $f_{conv}$ calculated in advance by the conversion function calculation unit 142, the displacement amplitude $w_{est}$, which is the displacement amplitude of the superstructure 7 when the railway vehicle 6 moves on the superstructure 7 of the bridge 5. Specifically, the displacement amplitude estimation unit 144 calculates, as the speed amplitude $S_{av}$, the difference between the maximum value $\max\{s_{av}(t)\}$ and the minimum value $\min\{s_{av}(t)\}$ of the speed vibration component $s_{av}(t)$, as in the previously described Equation (53). Then, the displacement amplitude estimation unit 144 reads out the conversion function data 135 stored in the storage unit 13, and calculates the displacement amplitude $w_{est}(t)$ by substituting the calculated speed amplitude $S_{av}$ into the conversion function $f_{conv}$, as in the previously described Equation (54). That is, the displacement amplitude estimation unit 144 performs the processing of the displacement amplitude estimation step S40 in FIG. 20, specifically, the processing of steps S401 and S402 in FIG. 22.

The displacement amplitude $w_{est}(t)$ is stored in the storage unit 13 as at least a part of the measurement data 136. The measurement data 136 may include the speed vibration component $s_{av}(t)$, the speed amplitude $S_{av}$, and the like in addition to the displacement amplitude $w_{est}(t)$.

The measurement data output unit 145 reads out the measurement data 136 stored in the storage unit 13 and outputs the measurement data 136 to the monitoring device 3. Specifically, under the control of the measurement data output unit 145, the second communication unit 12 transmits the measurement data 136 stored in the storage unit 13 to the monitoring device 3 via the communication network 4. That is, the measurement data output unit 145 performs the processing of the measurement data output step S50 in FIG. 20.

As described above, the measurement program 131 is a program that causes the measurement device 1, which is a computer, to execute each procedure of the flowchart shown in FIG. 20.

As shown in FIG. 23, the monitoring device 3 includes a communication unit 31, a processor 32, a display unit 33, an operation unit 34, and a storage unit 35.

The communication unit 31 receives the measurement data 136 from the measurement device 1 and outputs the received measurement data 136 to the processor 32.

The display unit 33 displays various types of information under the control of the processor 32. The display unit 33 may be, for example, a liquid crystal display or an organic EL display. EL is an abbreviation for electro luminescence.

The operation unit 34 outputs operation data corresponding to an operation by a user to the processor 32. The operation unit 34 may be, for example, an input device such as a mouse, a keyboard, or a microphone.

The storage unit 35 is a memory that stores various programs, data, and the like for the processor 32 to perform calculation processing and control processing. The storage unit 35 stores programs, data, and the like for the processor 32 to implement predetermined application functions.

The processor 32 acquires the measurement data 136 received by the communication unit 31, generates evaluation information by evaluating a temporal change in the displacement amplitude $w_{est}(t)$ of the superstructure 7 based on the acquired measurement data 136, and displays the generated evaluation information on the display unit 33.

In the present embodiment, the processor 32 functions as a measurement data acquisition unit 321 and a monitoring unit 322 by executing a monitoring program 351 stored in the storage unit 35. That is, the processor 32 includes the measurement data acquisition unit 321 and the monitoring unit 322.

The measurement data acquisition unit 321 acquires the measurement data 136 received by the communication unit 31, and adds the acquired measurement data 136 to a measurement data sequence 352 stored in the storage unit 35.

The monitoring unit 322 statistically evaluates, based on the measurement data sequence 352 stored in the storage unit 35, a temporal change in the displacement amplitude $w_{est}(t)$ of the superstructure 7. Then, the monitoring unit 322 generates evaluation information indicating an evaluation result, and displays the generated evaluation information on the display unit 33. The user can monitor a state of the superstructure 7 based on the evaluation information displayed on the display unit 33.

The monitoring unit 322 may perform processing such as monitoring of the railway vehicle 6 and determination of an abnormality in the superstructure 7 based on the measurement data sequence 352 stored in the storage unit 35.

The processor 32 transmits, based on the operation data output from the operation unit 34, information for adjusting operation states of the measurement device 1 and the accelerometer 2 to the measurement device 1 via the communication unit 31. The operation state of the measurement device 1 is adjusted according to the information received via the second communication unit 12. The measurement device 1 transmits information for adjusting the operation state of the accelerometer 2 received via the second communication unit 12 to the accelerometer 2 via the first communication unit 11. The operation state of the accelerometer 2 is adjusted according to the information received via the communication unit 21.

In the processors 14, 23, and 32, for example, the functions of the respective units may be implemented by individual hardware, or the functions of the respective units may be implemented by integrated hardware. For example, the processors 14, 23, and 32 include hardware, and the hardware may include at least one of a circuit that processes a digital signal and a circuit that processes an analog signal. The processors 14, 23, and 32 may be a CPU, a GPU, a DSP, or the like. CPU is an abbreviation for central processing unit. GPU is an abbreviation for graphics processing unit. DSP is an abbreviation for digital signal processor. The processors 14, 23, and 32 may be configured as custom ICs such as ASICs so as to implement the functions of the respective units, or may implement the functions of the respective units by a CPU and an ASIC. ASIC is an abbreviation for application specific integrated circuit. IC is an abbreviation for integrated circuit.

The storage units 13, 24, and 35 are implemented by, for example, various IC memories such as a ROM, a flash ROM, and a RAM, and a recording medium such as a hard disk, and a memory card. ROM is an abbreviation for read only memory. RAM is an abbreviation for random access memory. IC is an abbreviation for integrated circuit. The storage units 13, 24, and 35 include a non-volatile information storage device that is a computer-readable device or a medium, and various programs, data, and the like may be stored in the information storage device. The information storage device may be an optical disk such as an optical disk DVD or a CD, a hard disk drive, or various memories such as a card type memory or a ROM.

Although only one accelerometer 2 is shown in FIG. 23, each of a plurality of accelerometers 2 may generate the acceleration data 242 and transmit the acceleration data 242 to the measurement device 1. In this case, the measurement device 1 receives the plurality of pieces of acceleration data 242 transmitted from the plurality of accelerometers 2, generates the plurality of pieces of measurement data 136, and transmits the plurality of pieces of measurement data 136 to the monitoring device 3. The monitoring device 3 receives the plurality of pieces of measurement data 136 transmitted from the measurement device 1, and monitors the states of the plurality of superstructures 7 based on the plurality of pieces of received measurement data 136.

1-5. Function and Effect

In the measurement method according to the first embodiment described above, since drift does not occur in the displacement $w_u(t)$ modeled based on the approximate expression of the deflection of the superstructure 7 of the bridge 5 and the environmental information, the conversion function $f_{conv}$ calculated in advance based on the displacement $w_u(t)$ has relatively high conversion accuracy. Specifically, the measurement device 1 calculates with high accuracy, based on the approximate expression of the deflection of the superstructure 7, the environmental information, and the acceleration data output from the accelerometer 2 when the railway vehicle 6 moves on the superstructure 7, the deflection amount $T_{std}(t)$ of the superstructure 7 due to the railway vehicle 6, and calculates, as the conversion function $f_{conv}$, the function representing the relationship between the displacement amplitude $W_u$, which is the amplitude of the displacement $w_u(t)$ based on the deflection amount $T_{std}(t)$ calculated with high accuracy, and the speed amplitude $S_v$, which is the amplitude of the speed vibration component $s_v(t)$ with high accuracy obtained by performing the differential processing and the filter processing on the displacement $w_u(t)$. Therefore, the conversion function $f_{conv}$ with high accuracy can be obtained. In particular, the measurement device 1 can calculate the deflection amount $T_{std}(t)$ reflecting a configuration of the superstructure 7 on which the railway vehicle 6 moves and calculate the conversion function $f_{conv}$ with high accuracy by using the equation based on the simple beam supporting both ends, which is the structure model of the superstructure 7, as the approximate expression of the deflection of the superstructure 7. In the measurement method according to the first embodiment, the measurement device 1 calculates the speed vibration component $s_{av}(t)$ by performing the integration processing and the filter processing on the acceleration $\alpha_a(t)$ based on the acceleration data output from the accelerometer 2 when the railway vehicle 6 moves on the superstructure 7, the drift included in the speed vibration component $s_{av}(t)$ is reduced by the filter processing. Then, the measurement device 1 estimates, based on the amplitude of the speed vibration component $s_{av}(t)$ and the conversion function $f_{conv}$, the displacement amplitude $w_{est}(t)$ which is the displacement amplitude of the superstructure 7 when the railway vehicle 6 moves on the superstructure 7. Therefore, the influence of a significant drift caused by twice integrating the acceleration $\alpha_a(t)$ based on the acceleration data does not occur. Therefore, according to the measurement method according to the first embodiment, the measurement device 1 can accurately estimate, based on the speed vibration component $s_{av}(t)$ in which the drift is reduced and the conversion function $f_{conv}$ with high accuracy, the displacement amplitude $w_{est}(t)$ of the superstructure 7 when the railway vehicle 6 moves on the superstructure 7.

In the measurement method according to the first embodiment, since the measurement device 1 is not affected by a significant drift caused by twice integrating the acceleration $\alpha_a(t)$, no drift correction processing is required. Further, the measurement device 1 estimates the simpler displacement amplitude $w_{est}(t)$ rather than the displacement waveform of the superstructure 7 when the railway vehicle 6 moves on the superstructure 7 by a simple calculation of calculating the speed vibration component $s_{av}(t)$ by performing the integration processing and the filter processing on the acceleration $\alpha_a(t)$, calculating the speed amplitude $S_{av}$ which is the difference between the maximum value and the minimum value of the speed vibration component $s_{av}(t)$, and substituting the speed amplitude $S_{av}$ into the conversion function $f_{conv}$. Therefore, according to the measurement method in the first embodiment, an amount of calculation for the measurement device 1 to estimate the displacement amplitude $w_{est}(t)$ is small, and it is possible to implement an increase in speed and a reduction in cost of the estimation processing.

According to the measurement method in the first embodiment, the measurement device 1 calculates the displacement amplitude $W_u$ which is the difference between the maximum value and the minimum value of the displacement $w_u(t)$, and calculates the speed amplitude $S_v$ which is the difference between the maximum value and the minimum value of the speed vibration component $s_v(t)$, so that the displacement amplitude $W_u$ and the speed amplitude $S_v$ can be calculated with a small amount of calculation. According to the measurement method in the first embodiment, the measurement device 1 can calculate the conversion function $f_{conv}$ with high accuracy by using a maximum amplitude of high S/N as both the displacement amplitude $W_u$ and the speed amplitude $S_v$.

According to the measurement method in the first embodiment, since the measurement device 1 uses the accelerometer 2 which has a higher degree of freedom of installation than the displacement meter and a distortion gauge and can be easily installed, in order to estimate the displacement amplitude $w_{est}(t)$, reduction in cost of the measurement system 10 is possible.

2. Second Embodiment

Hereinafter, in a second embodiment, the same components as those in the first embodiment will be denoted by the same reference numerals, repetitive description as that in the first embodiment will be omitted or simplified, and contents different from those in the first embodiment will be mainly described.

In the second embodiment, the measurement device 1 calculates the observation information based on the acceleration data output from the accelerometer 2 when the railway vehicle 6 moves on the superstructure 7 of the bridge 5, calculates a value of a parameter p based on the environmental information created in advance and the calculated observation information, and selects the conversion function $f_{conv}$ from a plurality of conversion functions $f_{conv}(p)$ calculated in advance. Then, the measurement device 1 estimates, based on the selected conversion function $f_{conv}$, a displacement amplitude waveform of the superstructure 7 when the railway vehicle 6 moves on the superstructure 7 of the bridge 5.

In the present embodiment, the measurement device 1 calculates in advance the plurality of conversion functions $f_{conv}(p)$ when at least a part of assumed environmental information and at least a part of assumed observation information are assumed to be the parameter p, based on the approximate expression of the deflection of the superstructure 7 and the environmental information.

The waveform of the displacement $w_u(t)$ calculated by the previously described Equation (43) changes depending on the waveform of the deflection amount $C_{std}(C_m,t)$ of each vehicle of the railway vehicle 6 calculated by the previously described Equation (41) and an overlapping manner of the waveforms. The parameter having an influence on the change in the waveform of the displacement $w_u(t)$ includes the length $L_C(C_m)$ of the vehicle of the railway vehicle 6, the number of vehicles $C_T$ of the railway vehicle 6, the length $L_B$ of the superstructure 7, the position $L_x$ of the observation point R, the passing time $t_s$ of the superstructure 7 by the railway vehicle 6, and the average speed $v_{avg}$ of the railway vehicle 6.

Therefore, the measurement device 1 calculates a plurality of displacements $w_u(t\ p)$ which are displacements $w_u(t)$ at a plurality of values of the parameter p on an assumption that the values as the parameter p, as in Equation (55). That is, in the first embodiment, the measurement device 1 refers to the length $L_B$ of the superstructure 7, the position $L_x$ of the observation point R, and the length $L_{C(C_m)}$ of the vehicle, which are included in the environmental information, calculates the number of vehicles $C_T$, the passing time $t_s$, and the average speed $v_{avg}$ based on the acceleration data, and calculates the deflection amount $T_{std}(t)$ according to the previously described Equation (42). In the second embodiment, the measurement device 1 sets the parameter p to each of a plurality of assumed values, and calculates a plurality of deflection amounts $T_{std}(t\ p)$ at the plurality of values of the parameter p. Then, the measurement device 1 multiplies each of the plurality of deflection amounts $T_{std}(t\ p)$ by the applied load P, and further performs low-pass filter processing to calculate a plurality of displacements $w_u(t\ p)$, as in Equation (56).

$$p = (L_C(C_m)C_T L_B L_x t_s v_a) \quad (55)$$

$$w_u(tp) = f_{LPF}(P \times T_{std}(tp)) \quad (56)$$

Next, the measurement device 1 differentiates the plurality of displacements $w_u(t\ p)$ to calculate a plurality of speeds $w_v(t\ p)$, as in Equation (57).

$$w_v(t\ p) = \frac{d}{dt} w_u(t\ p) \quad (57)$$

Next, the measurement device 1 performs high-pass filter processing on the plurality of speeds $w_v(t\ p)$ to calculate a plurality of speed vibration components $s_v(t\ p)$, as in Equation (58).

$$s_v(tp) = f_{HPF}(w_v(tp)) \quad (58)$$

Next, the measurement device 1 calculates a difference between a maximum value $\max\{w_u(t\ p)\}$ and a minimum value $\min\{w_u(t\ p)\}$ of each of the plurality of displacements $w_u(t\ p)$ as a displacement amplitude $W_u(p)$, as in Equation (59).

$$W_u(p) = \max\{w_u(tp)\} - \min\{w_u(tp)\} \quad (59)$$

The measurement device 1 calculates a difference between a maximum value $\max\{s_v(t\ p)\}$ and a minimum value $\min\{s_v(t\ p)\}$ of each of the plurality of speed vibration components $s_v(t\ p)$ as a speed amplitude $S_v(p)$, as in Equation (60).

$$s_v(p) = \max\{s_v(tp)\} - \min\{s_v(tp)\} \quad (60)$$

Then, the measurement device 1 calculates the plurality of conversion functions $f_{conv}(p)$ by using a plurality of displacement amplitudes $W_u(p)$ and a plurality of speed amplitudes $S_v(p)$. For example, the measurement device 1 calculates a ratio between the displacement amplitude $W_u(p)$ and the speed amplitude $S_v(p)$ as a linear coefficient $R_{uv}(p)$ of the conversion function $f_{conv}(p)$ by using the plurality of conversion functions $f_{conv}(p)$ as linear functions and using Equation (61). For example, it is assumed that a zero-order coefficient of the conversion function $f_{conv}(p)$ is 0.

$$R_{uv}(p) = \frac{W_u(p)}{S_v(p)} \quad (61)$$

Figure 24:
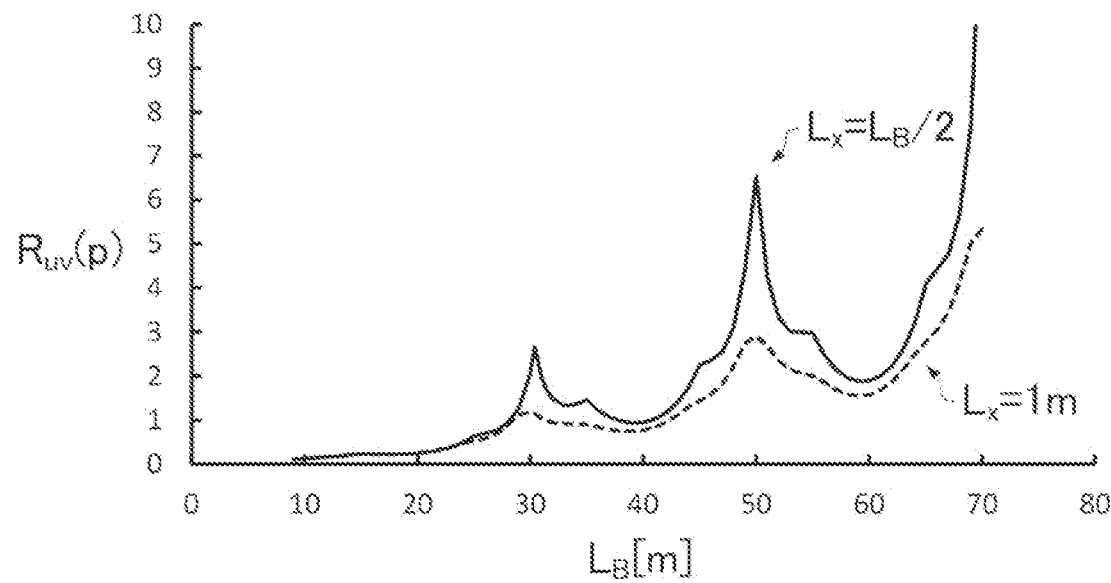
FIG. 24 is a diagram showing an example of a relationship between a length $L_B$ of the superstructure and a linear coefficient $R_{uv}(p)$.

A value of the linear coefficient $R_{uv}(p)$ changes depending on the value of the parameter p. FIG. 24 shows an example of a relationship between the length $L_B$ of the superstructure 7 and the linear coefficient $R_{uv}(p)$ when the passing time $t_s$ is set to 10 seconds and the length $L_C(C_m)$ of the vehicle is set to 20 m. In FIG. 24, a solid line indicates a relationship between the length $L_B$ of the superstructure 7 and the linear coefficient $R_{uv}(p)$ when the position $L_x$ of the observation point R is set to ½ of the length $L_B$ of the superstructure 7, and a broken line indicates a relationship between the length $L_B$ of the superstructure 7 and the linear coefficient $R_{uv}(p)$ when the position $L_x$ of the observation point R is set to 1 m.

Figure 25:
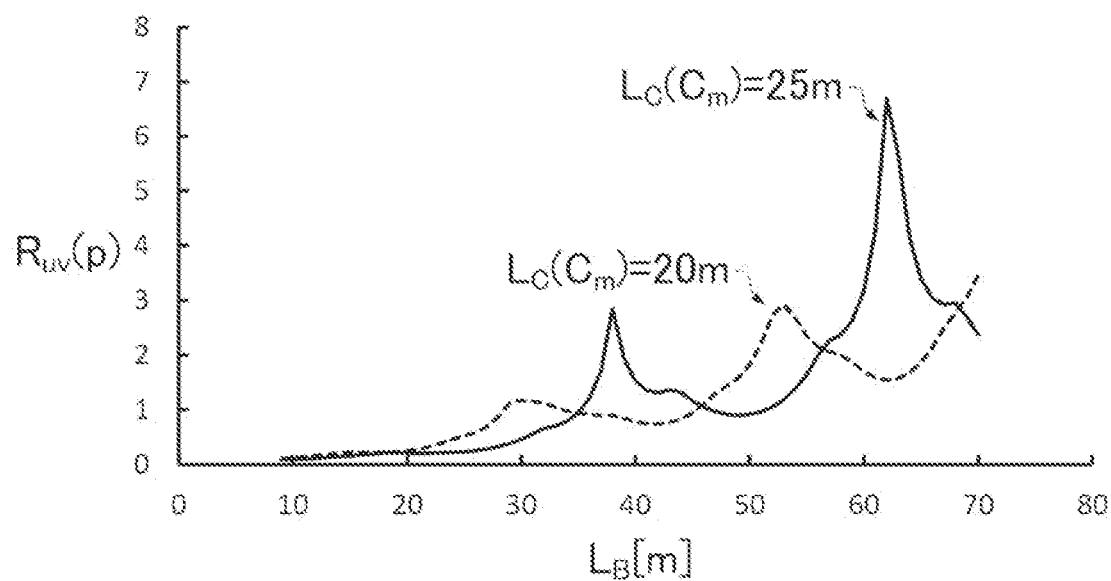
FIG. 25 is a diagram showing another example of the relationship between the length $L_B$ of the superstructure and the linear coefficient $R_{uv}(p)$.

FIG. 25 shows an example of the relationship between the length $L_B$ of the superstructure 7 and the linear coefficient $R_{uv}(p)$ when the passing time $t_s$ is set to 10 seconds and the position $L_x$ of the observation point R is set to ½ of the length $L_B$ of the superstructure 7. In FIG. 25, a solid line indicates the relationship between the length $L_B$ of the superstructure 7 and the linear coefficient $R_{uv}(p)$ when the length $L_C(C_m)$ of the vehicle is set to 25 m, and a broken line indicates the relationship between the length $L_B$ of the superstructure 7 and the linear coefficient $R_{uv}(p)$ when the length $L_C(C_m)$ of the vehicle is set to 20 m.

Figure 26:
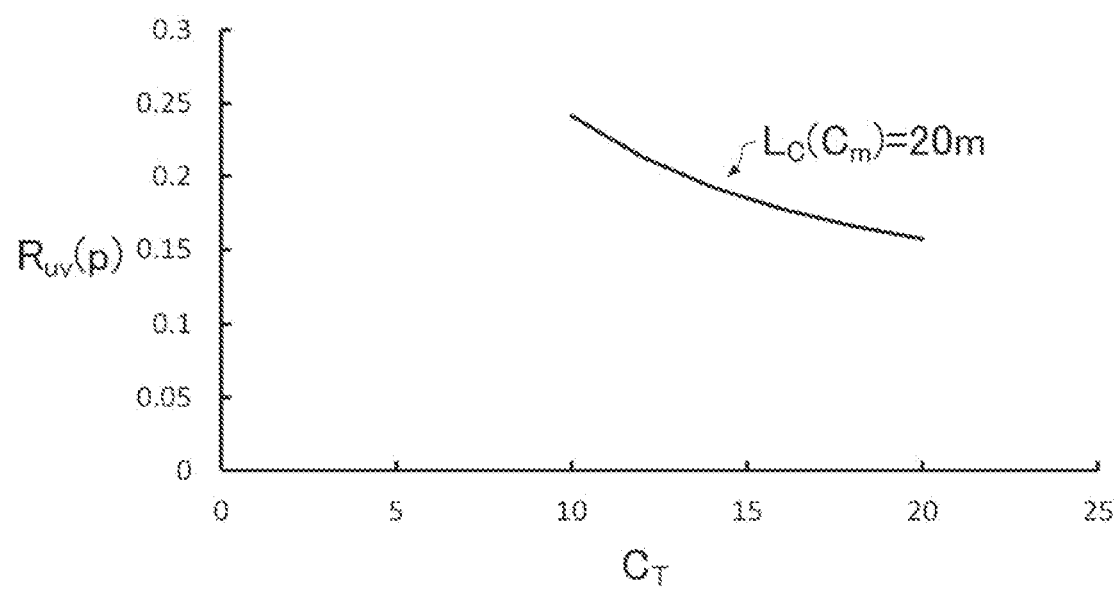
FIG. 26 is a diagram showing an example of a relationship between the number of vehicles $C_T$ and the linear coefficient $R_{uv}(p)$.

FIG. 26 shows an example of a relationship between the number of vehicles $C_T$ and the linear coefficient $R_{uv}(p)$ when the passing time $t_s$ is set to 10 seconds, the position $L_x$ of the observation point R is set to ½ of the length $L_B$ of the superstructure 7, the length $L_C(C_m)$ of the vehicle is set to 20 m, and the length $L_B$ of the superstructure 7 is set to 20 m.

Figure 27:
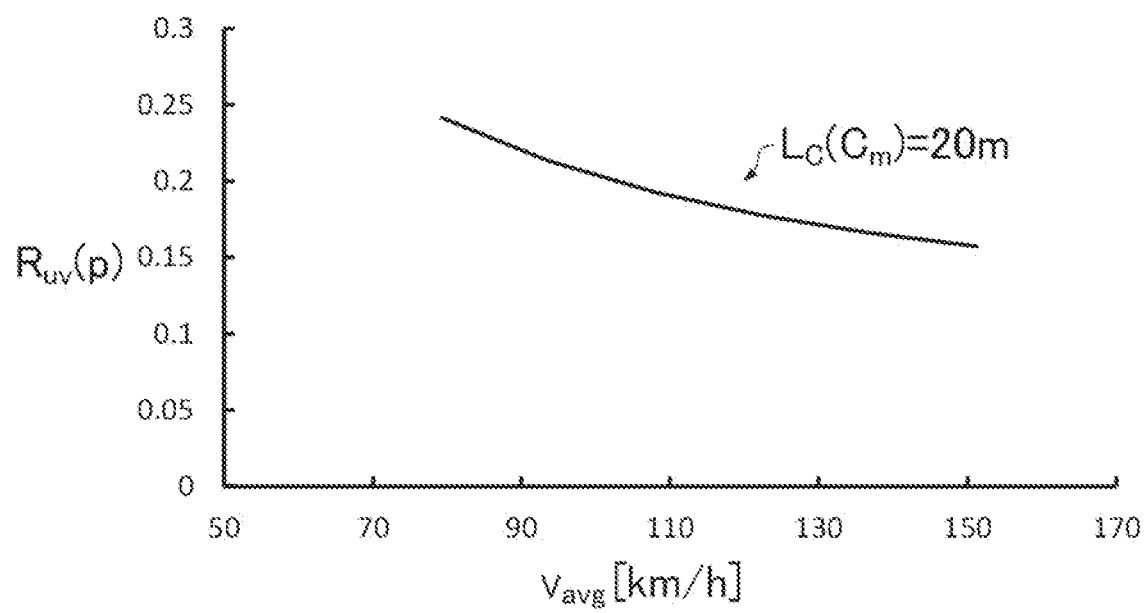
FIG. 27 is a diagram showing an example of a relationship between an average speed $v_{avg}$ and the linear coefficient $R_{uv}(p)$.

FIG. 27 shows an example of a relationship between the average speed $v_{avg}$ and the linear coefficient $R_{uv}(p)$ when the passing time $t_s$ is set to 10 seconds, the position $L_x$ of the observation point R is set to ½ of the length $L_B$ of the superstructure 7, the length $L_C(C_m)$ of the vehicle is set to 20 m, and the length $L_B$ of the superstructure 7 is set to 20 m.

As described above, since a value of the linear coefficient $R_{uv}(p)$ changes depending on the value of the parameter p, the measurement device 1 calculates in advance the linear coefficients $R_{uv}(p)$ of the plurality of conversion functions $f_{conv}(p)$ at the plurality of assumed values of the parameter p, and creates conversion function data in which the value of the parameter p and the value of the linear coefficient $R_{uv}(p)$ of the conversion function $f_{conv}(p)$ are associated with each other.

In the above description, the parameter p includes all of the length $L_C(C_m)$ of the vehicle, the number of vehicles $C_T$, the length $L_B$ of the superstructure 7, the position $L_x$ of the observation point R, the passing time $t_s$, and the average speed $v_{avg}$. The measurement device 1 may calculate the plurality of conversion functions $f_{conv}(p)$ using at least one of these as the parameter p.

Thereafter, in a state in which the accelerometer 2 is installed on the superstructure 7 of the bridge 5, first, the measurement device 1 acquires acceleration data output from the accelerometer 2 when the railway vehicle 6 passes through the superstructure 7, and calculates the speed $v_{ma}(t)$ according to the previously described Equations (1) to (5). Next, the measurement device 1 calculates a time point at a minimum peak of falling of a value range in which the speed $v_{ma}(t)$ has a negative value as the entry time point $t_i$, and calculates a time point at a maximum peak of rising of a value range in which the speed $v_{ma}(t)$ has a positive value as the exit time point $t_o$. Then, the measurement device 1 calculates the passing time $t_s$ during which the railway vehicle 6 passes through the superstructure 7 from the entry time point $t_i$ and the exit time point $t_o$ according to the previously described Equation (6). The measurement device 1 calculates the number of vehicles $C_T$ of the railway vehicle 6 according to the previously described Equation (7).

Next, the measurement device 1 calculates, for example, the length $L_C(C_m)$ of the vehicle of the railway vehicle 6 from the passing time $t_s$ and the number of vehicles $C_T$. Alternatively, the measurement device 1 may specify the type of the railway vehicle 6 from the passing time point of the railway vehicle 6 and select a corresponding one from the lengths $L_C(C_m)$ of the plurality of vehicles included in the environmental information. Further, the measurement device 1 calculates the average speed $v_{avg}$ of the railway vehicle 6 according to, for example, the previously described Equations (9) to (11).

The measurement device 1 acquires the length $L_B$ of the superstructure 7 and the position $L_x$ of the observation point R included in the environmental information. Accordingly, since the value of the parameter p when the railway vehicle 6 passes through the superstructure 7 is specified, the measurement device 1 selects the conversion function $f_{conv}$ (p) corresponding to the specified value of the parameter p as the conversion function $f_{conv}$, with reference to the conversion function data. The conversion function $f_{conv}$ is an example of a first conversion function.

Then, the measurement device 1 estimates the displacement amplitude $w_{est}(t)$ of the superstructure 7 when the railway vehicle 6 passes through the superstructure 7 of the bridge 5 according to the previously described Equations (51) to (54).

Figure 28:
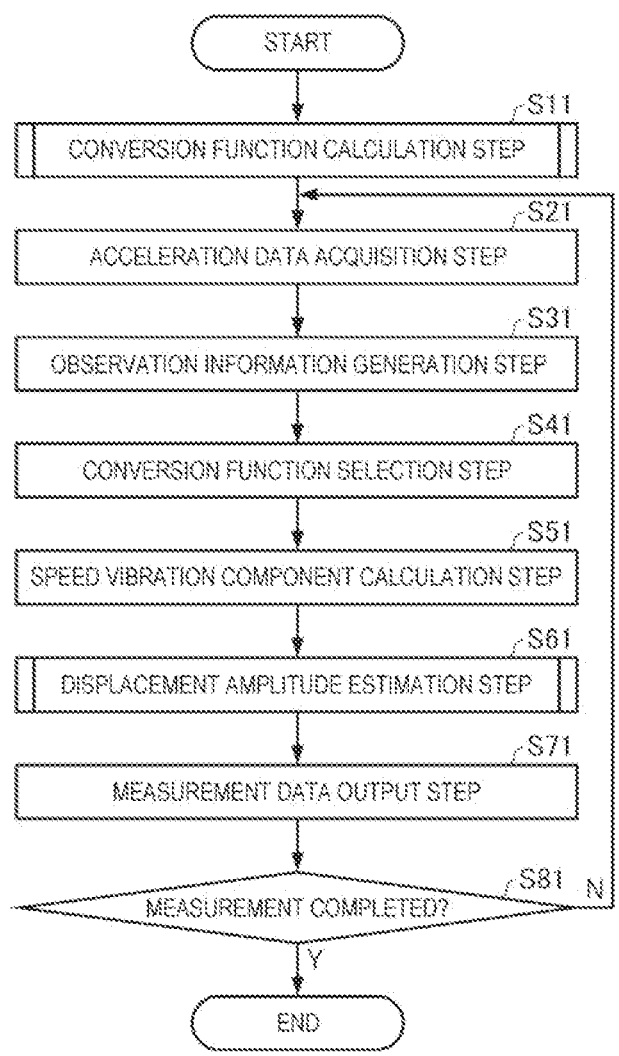
FIG. 28 is a flowchart showing an example of a procedure of a measurement method according to a second embodiment.

FIG. 28 is a flowchart showing an example of a procedure of a measurement method according to the second embodiment. In the present embodiment, the measurement device 1 of the measurement system 10 executes a procedure shown in FIG. 28.

As shown in FIG. 28, first, in a conversion function calculation step S11, the measurement device 1 calculates the plurality of conversion functions $f_{conv}(p)$ based on the approximate expression of the deflection of the superstructure 7 and the environmental information created in advance. An example of the procedure of the conversion function calculation step S11 will be described later.

Next, in an acceleration data acquisition step S21, the measurement device 1 acquires the acceleration data output from the accelerometer 2 that observes the observation point R on the superstructure 7 when the railway vehicle 6 moves on the superstructure 7 of the bridge 5.

Next, in an observation information generation step S31, the measurement device 1 generates, based on the acceleration data acquired in the step S21, the observation information including the entry time point $t_i$ and the exit time point $t_o$ of the railway vehicle 6 with respect to the superstructure 7 and the number of vehicles $C_T$ of the railway vehicle 6.

Next, in a conversion function selection step S41, the measurement device 1 selects, based on the environmental information created in advance and the observation information generated in the step S31, the conversion function $f_{conv}$ from the plurality of conversion functions $f_{conv}(p)$ calculated in the step S11. Specifically, the measurement device 1 calculates the passing time $t_s$ during which the railway vehicle 6 passes through the superstructure 7 of the bridge 5 from the entry time point $t_i$ and the exit time point $t_o$ included in the observation information according to the previously described Equation (6). The measurement device 1 calculates the length $L_C(C_m)$ of the railway vehicle 6 from, for example, the passing time $t_s$ and the number of vehicles $C_T$, and further calculates the average speed $v_{avg}$ of the railway vehicle 6 according to the previously described Equations (9) to (11). Then, the measurement device 1 acquires the length $L_B$ of the superstructure 7 and the position $L_x$ of the observation point R included in the environmental information, specifies the value of the parameter p when the railway vehicle 6 passes through the superstructure 7, and selects the conversion function $f_{conv}$ corresponding to the specified value of the parameter p from the plurality of conversion functions $f_{conv}(p)$.

Next, in a speed vibration component calculation step S51, the measurement device 1 calculates, based on the acceleration data acquired in the step S21, the speed vibration component $s_{av}(t)$ by performing integration processing and filter processing on the acceleration $\alpha_{ip}(t)$, as in the previously described Equations (51) and (52). For example, the filter processing may be high-pass filter processing or band-pass filter processing. The speed vibration component $s_{av}(t)$ is an example of the first speed vibration component.

Next, in a displacement amplitude estimation step S61, the measurement device 1 estimates, based on the speed vibration component $s_{av}(t)$ calculated in the step S51 and the conversion function $f_{conv}$ selected in the step S41, the displacement amplitude $w_{est}(t)$, which is the displacement amplitude of the superstructure 7 when the railway vehicle 6 moves on the superstructure 7 of the bridge 5, as in the previously described Equations (53) and (54). An example of the procedure of the displacement amplitude estimation step S61 is the same as that of FIG. 22, and thus illustration and description thereof is omitted.

Next, in a measurement data output step S71, the measurement device 1 outputs the measurement data including the displacement amplitude $w_{est}(t)$ calculated in the step S61 to the monitoring device 3. Specifically, the measurement device 1 transmits the measurement data to the monitoring device 3 via the communication network 4. The measurement data may include the speed vibration component $s_{av}(t)$, the speed amplitude $S_{av}$, and the like in addition to the displacement amplitude $w_{est}(t)$.

Then, the measurement device 1 repeatedly performs the processing of steps S21 to S71 until the measurement is completed in step S81.

The measurement device 1 may perform step S51 before step S31 or step S41.

Figure 29:
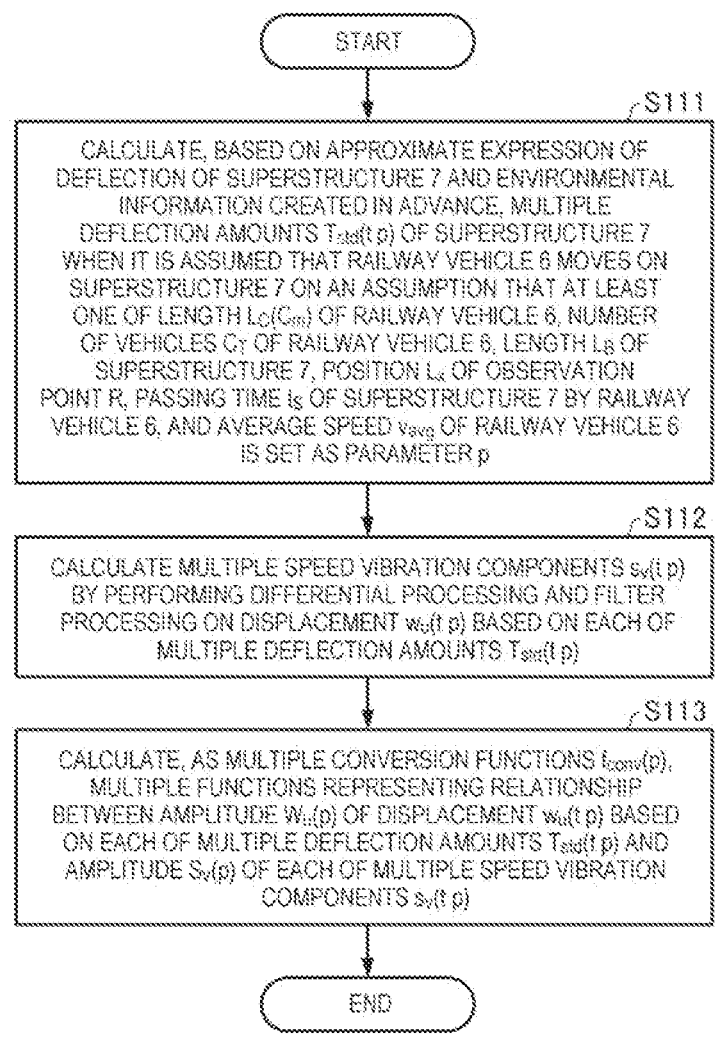
FIG. 29 is a flowchart showing an example of a procedure of a conversion function calculation step in the second embodiment.

FIG. 29 is a flowchart showing an example of the procedure of the conversion function calculation step S11 in FIG. 28.

As shown in FIG. 29, first, in step S111, the measurement device 1 calculates, based on the approximate expression of the deflection of the superstructure 7, which is the previously described Equation (34), and the environmental information created in advance, a plurality of deflection amounts $T_{std}(t\ p)$ of the superstructure 7 when it is assumed that the railway vehicle 6 moves on the superstructure 7 on an assumption that at least one of the length $L_C(C_m)$ of the vehicle of the railway vehicle 6, the number of vehicles $C_T$ of the railway vehicle 6, the length $L_B$ of the superstructure 7, the position $L_x$ of the observation point R, the passing time $t_s$ of the superstructure 7 by the railway vehicle 6, and the average speed $v_{avg}$ of the railway vehicle 6 is set as the parameter p. Specifically, the measurement device 1 sets a plurality of values assumed for the parameter p, and calculates a plurality of deflection amounts $T_{std}(t\ p)$ according to the previously described Equations (13) to (42).

Next, in step S112, the measurement device 1 calculates a plurality of speed vibration components $s_v(t\ p)$ by performing differential processing and filter processing on the displacement $w_u(t\ p)$ based on each of the plurality of deflection amounts $T_{std}(t\ p)$ calculated in the step S111, as in the previously described Equations (56), (57), and (58).

Finally, in step S113, the measurement device 1 calculates, as the plurality of conversion functions $f_{conv}(p)$, a plurality of functions representing the relationship between the displacement amplitude $W_u(p)$, which is the amplitude of the displacement $w_u(t\ p)$ based on each of the plurality of deflection amounts $T_{std}$(t p) calculated in the step S111, and the speed amplitude $S_v$(p), which is the amplitude of each of the plurality of speed vibration components $s_v$(t p) calculated in the step S112, as in the previously described Equations (59), (60), and (61). The displacement amplitude $W_u$(p) is a difference between the maximum value max$\{w_u$(t p)$\}$ and the minimum value min$\{w_u$(t p)$\}$ of the displacement $w_u$(t p). The speed amplitude $S_v$(p) is a difference between the maximum value max$\{s_v$(t p)$\}$ and the minimum value min$\{s_v$(t p)$\}$ of the speed vibration component $s_v$(t p).

Figure 30:
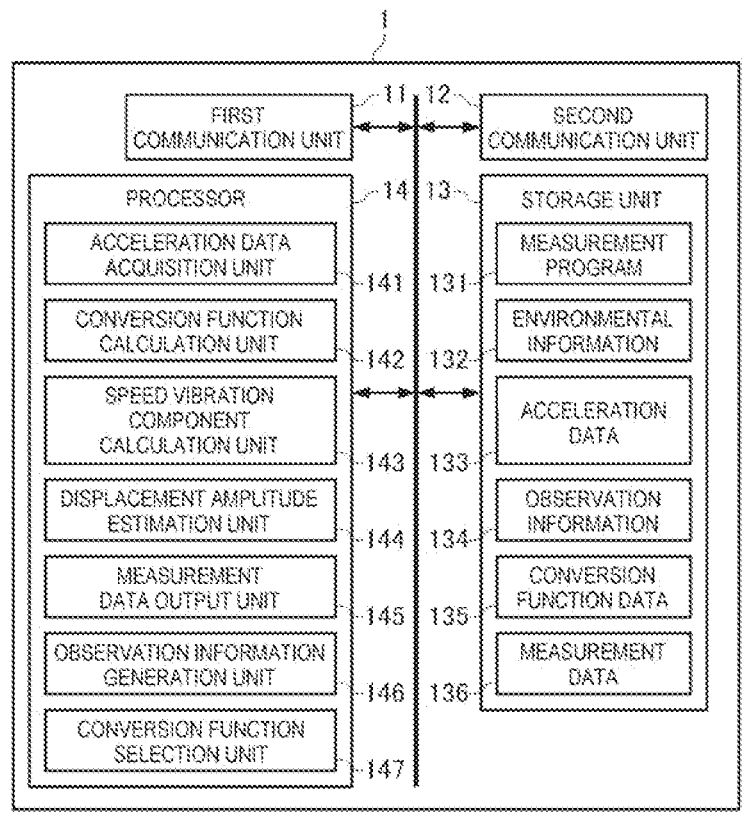
FIG. 30 is a diagram showing a configuration example of a measurement device according to the second embodiment.

FIG. 30 is a diagram showing a configuration example of the measurement device 1 according to the second embodiment. As shown in FIG. 30, the measurement device 1 according to the second embodiment includes the first communication unit 11, the second communication unit 12, the storage unit 13, and the processor 14, similarly to the first embodiment. Since the functions of the first communication unit 11, the second communication unit 12, and the storage unit 13 are similar to those in the first embodiment, description thereof is omitted.

In the present embodiment, the processor 14 functions as the acceleration data acquisition unit 141, the conversion function calculation unit 142, the speed vibration component calculation unit 143, the displacement amplitude estimation unit 144, the measurement data output unit 145, an observation information generation unit 146, and a conversion function selection unit 147 by executing the measurement program 131 stored in the storage unit 13. That is, the processor 14 includes the acceleration data acquisition unit 141, the conversion function calculation unit 142, the speed vibration component calculation unit 143, the displacement amplitude estimation unit 144, the measurement data output unit 145, the observation information generation unit 146, and the conversion function selection unit 147.

The conversion function calculation unit 142 calculates the plurality of conversion functions $f_{conv}$(p) based on the approximate expression of the deflection of the superstructure 7 and the environmental information 132. The environmental information 132 is created in advance and stored in the storage unit 13. Specifically, first, the conversion function calculation unit 142 calculates, based on the approximate expression of the deflection of the superstructure 7, which is the previously described Equation (34), and the environmental information 132, a plurality of deflection amounts $T_{std}$(t p) of the superstructure 7 when it is assumed that the railway vehicle 6 moves on the superstructure 7 on an assumption that at least one of the length $L_{C_iC_m}$ of the vehicle of the railway vehicle 6, the number of vehicles $C_T$ of the railway vehicle 6, the length $L_B$ of the superstructure 7, the position $L_x$ of the observation point R, the passing time $t_s$ of the superstructure 7 by the railway vehicle 6, and the average speed $v_{avg}$ of the railway vehicle 6 is set as the parameter p. Next, the conversion function calculation unit 142 calculates a plurality of speed vibration components $s_v$(t p) by performing the differential processing and the filter processing on the displacement $w_u$(t p) based on each of the plurality of calculated deflection amounts $T_{std}$(t p), as in the previously described Equations (56), (57), and (58). Next, the conversion function calculation unit 142 calculates, as the plurality of conversion functions $f_{conv}$(p), a plurality of functions representing the relationship between the displacement amplitude $W_u$(p), which is the amplitude of the displacement $w_u$(t p) based on each of the plurality of calculated deflection amounts $T_{std}$(t p), and the speed amplitude $S_v$(p), which is the amplitude of each of the plurality of calculated speed vibration components $s_v$(t p), as in the previously described Equations (59), (60), and (61). Then, the conversion function calculation unit 142 stores the conversion function data 135 in which the value of the parameter p and each coefficient value of the conversion function $f_{conv}$(p) are associated with each other in the storage unit 13. That is, the conversion function calculation unit 142 performs the processing of the conversion function calculation step S11 in FIG. 28, specifically, the processing of steps S111, S112, and S113 in FIG. 29.

The acceleration data acquisition unit 141 acquires the acceleration data output from the accelerometer 2 when the railway vehicle 6 moves on the superstructure 7 of the bridge 5. Specifically, the acceleration data acquisition unit 141 acquires the acceleration data 242 received by the first communication unit 11, and stores the acceleration data 242 in the storage unit 13 as the acceleration data 133. That is, the acceleration data acquisition unit 141 performs the processing of the acceleration data acquisition step S21 in FIG. 28.

The observation information generation unit 146 generates, based on the acceleration data acquired by the acceleration data acquisition unit 141, the observation information including the entry time point $t_i$ and the exit time point $t_o$ of the railway vehicle 6 with respect to the superstructure 7 and the number of vehicles $C_T$ of the railway vehicle 6. Specifically, the observation information generation unit 146 reads out the acceleration data 133 stored in the storage unit 13, and calculates the speed $v_{ma}$(t) according to the previously described Equations (1) to (5). Then, the observation information generation unit 146 calculates a time point at a minimum peak of falling of a value range in which the speed $v_{ma}$(t) has a negative value as the entry time point $t_i$, and calculates a time point at a maximum peak of rising of a value range in which the speed $v_{ma}$(t) has a positive value as the exit time point $t_o$. The observation information generation unit 146 calculates the number of vehicles $C_T$ of the railway vehicle 6 according to the previously described Equation (7). That is, the observation information generation unit 146 performs the processing of the observation information generation step S31 in FIG. 28.

The conversion function selection unit 147 selects the conversion function $f_{conv}$ from the plurality of conversion functions $f_{conv}$(p) calculated by the conversion function calculation unit 142 based on the environmental information 132 and the observation information generated by the observation information generation unit 146. Specifically, the conversion function selection unit 147 calculates the passing time $t_s$ during which the railway vehicle 6 passes through the superstructure 7 of the bridge 5 from the entry time point $t_i$ and the exit time point $t_o$ included in the observation information according to the previously described Equation (6). The conversion function selection unit 147 calculates the length $L_{C_iC_m}$ of the vehicle of the railway vehicle 6 from, for example, the passing time $t_s$ and the number of vehicles $C_T$, and further calculates the average speed $v_{avg}$ of the railway vehicle 6 according to the previously described Equations (9) to (11). Then, the conversion function selection unit 147 acquires the length $L_B$ of the superstructure 7 and the position $L_x$ of the observation point R included in the environmental information 132, specifies the value of the parameter p when the railway vehicle 6 passes through the superstructure 7, refers to the conversion function data 135 stored in the storage unit 13, and selects the conversion function $f_{conv}$ corresponding to the specified value of the parameter p from the plurality of conversion functions $f_{conv}$(p). That is, the conversion function selection unit 147 performs the processing of the conversion function selection step S41 in FIG. 28.

The speed vibration component calculation unit 143 calculates the speed vibration component $s_{av}(t)$ by performing the integration processing and the filter processing on the acceleration $\alpha_{lp}(t)$ based on the acceleration data acquired by the acceleration data acquisition unit 141. Specifically, the speed vibration component calculation unit 143 reads out the acceleration data 133 stored in the storage unit 13, and calculates the speed vibration component $s_{av}(t)$ according to the previously described Equations (51) and (52). That is, the speed vibration component calculation unit 143 performs the processing of the speed vibration component calculation step S51 in FIG. 28.

The displacement amplitude estimation unit 144 estimates, based on the speed vibration component $s_{av}(t)$ calculated by the speed vibration component calculation unit 143 and the conversion function $f_{conv}$ selected by the conversion function selection unit 147, the displacement amplitude $w_{est}(t)$, which is the displacement amplitude of the superstructure 7 when the railway vehicle 6 moves on the superstructure 7 of the bridge 5. Specifically, the displacement amplitude estimation unit 144 calculates, as the speed amplitude $S_{av}$, the difference between the maximum value $\max\{s_{av}(t)\}$ and the minimum value $\min\{s_{av}(t)\}$ of the speed vibration component $s_{av}(t)$, as in the previously described Equation (53). Then, the displacement amplitude estimation unit 144 calculates the displacement amplitude $w_{est}(t)$ by substituting the calculated speed amplitude $S_{av}$ into the conversion function $f_{conv}$, as in the previously described Equation (54). That is, the displacement amplitude estimation unit 144 performs the processing of the displacement amplitude estimation step S61 in FIG. 28, specifically, the processing of steps S401 and S402 in FIG. 22.

The displacement amplitude $w_{est}(t)$ is stored in the storage unit 13 as at least a part of the measurement data 136. The measurement data 136 may include the speed vibration component $s_{av}(t)$, the speed amplitude $S_{av}$, and the like in addition to the displacement amplitude $w_{est}(t)$.

The measurement data output unit 145 reads out the measurement data 136 stored in the storage unit 13 and outputs the measurement data 136 to the monitoring device 3. Specifically, under the control of the measurement data output unit 145, the second communication unit 12 transmits the measurement data 136 stored in the storage unit 13 to the monitoring device 3 via the communication network 4. That is, the measurement data output unit 145 performs the processing of the measurement data output step S71 in FIG. 28.

As described above, the measurement program 131 is a program that causes the measurement device 1, which is a computer, to execute each procedure of the flowchart shown in FIG. 28.

In the measurement method according to the second embodiment described above, since drift does not occur in the displacement $w_u(t\ p)$ modeled based on the approximate expression of the deflection of the superstructure 7 of the bridge 5 and the environmental information, the plurality of conversion functions $f_{conv}(p)$ calculated in advance based on the displacement $w_u(t\ p)$ has relatively high conversion accuracy. Specifically, the measurement device 1 calculates, based on the approximate expression of the deflection of the superstructure 7 and the environmental information, the plurality of deflection amounts $T_{std}(t\ p)$ of the superstructure 7 when the parameter p is set to a plurality of values with high accuracy, and calculates, as the plurality of conversion functions $f_{conv}(p)$, a plurality of functions representing the relationship between the displacement amplitude $W_u(p)$, which is the amplitude of the displacement $w_u(t\ p)$ based on each of the plurality of deflection amounts $T_{std}(t\ p)$ calculated with high accuracy, and the speed amplitude $S_v(p)$, which is the amplitude of each of the plurality of speed vibration components $s_v(t\ p)$ with high accuracy obtained by performing the differential processing and the filter processing on the displacement $w_u(t\ p)$. Therefore, the plurality of conversion functions $f_{conv}(p)$ with high accuracy can be obtained. In particular, the measurement device 1 can calculate the plurality of deflection amounts $T_{std}(t\ p)$ reflecting the configuration of the superstructure 7 on which the railway vehicle 6 moves and calculate the plurality of conversion functions $f_{conv}(p)$ with high accuracy by using the equation based on the simple beam supporting both ends, which is the structure model of the superstructure 7, as the approximate expression of the deflection of the superstructure 7. Then, the measurement device 1 can select an appropriate conversion function $f_{conv}$ with high accuracy from the plurality of conversion functions $f_{conv}(p)$ with high accuracy based on the environmental information and the observation information calculated based on the acceleration data output from the accelerometer when the railway vehicle 6 moves on the superstructure 7. Since the measurement device 1 calculates the speed vibration component $s_{av}(t)$ by performing the integration processing and the filter processing on the acceleration $\alpha_a(t)$ based on the acceleration data output from the accelerometer 2 when the railway vehicle 6 moves on the superstructure 7, the drift included in the speed vibration component $s_{av}(t)$ is reduced by the filter processing. Then, the measurement device 1 estimates, based on the amplitude of the speed vibration component $s_{av}(t)$ and the selected conversion function $f_{conv}$, the displacement amplitude $w_{est}(t)$ which is the displacement amplitude of the superstructure 7 when the railway vehicle 6 moves on the superstructure 7. Therefore, the influence of a significant drift caused by twice integrating the acceleration $\alpha_a(t)$ based on the acceleration data does not occur. Therefore, according to the measurement method according to the second embodiment, the measurement device 1 can accurately estimate, based on the speed vibration component $s_{av}(t)$ in which the drift is reduced and the conversion function $f_{conv}$ with high accuracy, the displacement amplitude $w_{est}(t)$ of the superstructure 7 when the railway vehicle 6 moves on the superstructure 7.

In the measurement method according to the second embodiment, since the measurement device 1 is not affected by a significant drift caused by twice integrating the acceleration $\alpha_a(t)$, no drift correction processing is required. Further, the measurement device 1 estimates the simpler displacement amplitude $w_{est}(t)$ rather than the displacement waveform of the superstructure 7 when the railway vehicle 6 moves on the superstructure 7 by a simple calculation of calculating the speed vibration component $s_{av}(t)$ by performing the integration processing and the filter processing on the acceleration $\alpha_a(t)$, calculating the speed amplitude $S_{av}$ which is the difference between the maximum value and the minimum value of the speed vibration component $s_{av}(t)$, and substituting the speed amplitude $S_{av}$ into the conversion function $f_{conv}$. Further, when the railway vehicle 6 moves on the superstructure 7, the measurement device 1 selects the conversion function $f_{conv}$ from the plurality of conversion functions $f_{conv}(p)$ calculated in advance with high accuracy based on the approximate expression of the deflection of the superstructure 7 and the environmental information, and estimates the displacement amplitude $w_{est}(t)$ of the superstructure 7 based on the selected conversion function $f_{conv}$. Therefore, it is not necessary to calculate $f_{conv}$ every time the railway vehicle 6 moves on the superstructure 7. Therefore, according to the measurement method in the second embodiment, an amount of calculation for the measurement device 1 to estimate the displacement amplitude $w_{est}(t)$ is small, and it is possible to implement an increase in speed and a reduction in cost of the estimation processing.

According to the measurement method in the second embodiment, the measurement device 1 calculates the displacement amplitude $W_u(p)$ which is the difference between the maximum value and the minimum value of the displacement $w_u(t\ p)$, and calculates the speed amplitude $S_v(p)$ which is the difference between the maximum value and the minimum value of the speed vibration component $s_v(t\ p)$, so that the displacement amplitude $W_u(p)$ and the speed amplitude $S_v(p)$ can be calculated with a small amount of calculation. According to the measurement method in the second embodiment, the measurement device 1 can calculate the plurality of conversion functions $f_{conv}(p)$ with high accuracy by using a maximum amplitude of high S/N as both the displacement amplitude $W_u(p)$ and the speed amplitude $S_v(p)$.

According to the measurement method in the second embodiment, since the measurement device 1 uses the accelerometer 2 which has a higher degree of freedom of installation than the displacement meter and a distortion gauge and can be easily installed, in order to estimate the displacement amplitude $w_{est}(t)$, reduction in cost of the measurement system 10 is possible.

3. Modification

The present disclosure is not limited to the present embodiment, and various modifications can be made within the scope of the gist of the present disclosure.

In the above second embodiment, the measurement device 1 includes the conversion function calculation unit 142 and executes the conversion function calculation step S11. A device, which is not shown, different from the measurement device 1 or the monitoring device 3 may include the conversion function calculation unit 142 and perform the conversion function calculation step S11. In this case, the measurement device 1 may acquire the data in which the value of the parameter p and each coefficient value of the conversion function $f_{conv}(p)$ are associated with each other from the device which is not shown or the monitoring device 3, store the acquired data in the storage unit 13 as the conversion function data 135, and then execute the acceleration data acquisition step S21 and the subsequent steps.

In the above embodiments, the conversion function $f_{conv}$ or the conversion function $f_{conv}(p)$ is described as a linear function, and the conversion function $f_{conv}$ or the conversion function $f_{conv}(p)$ may be a quadratic or higher function.

Figure 31:
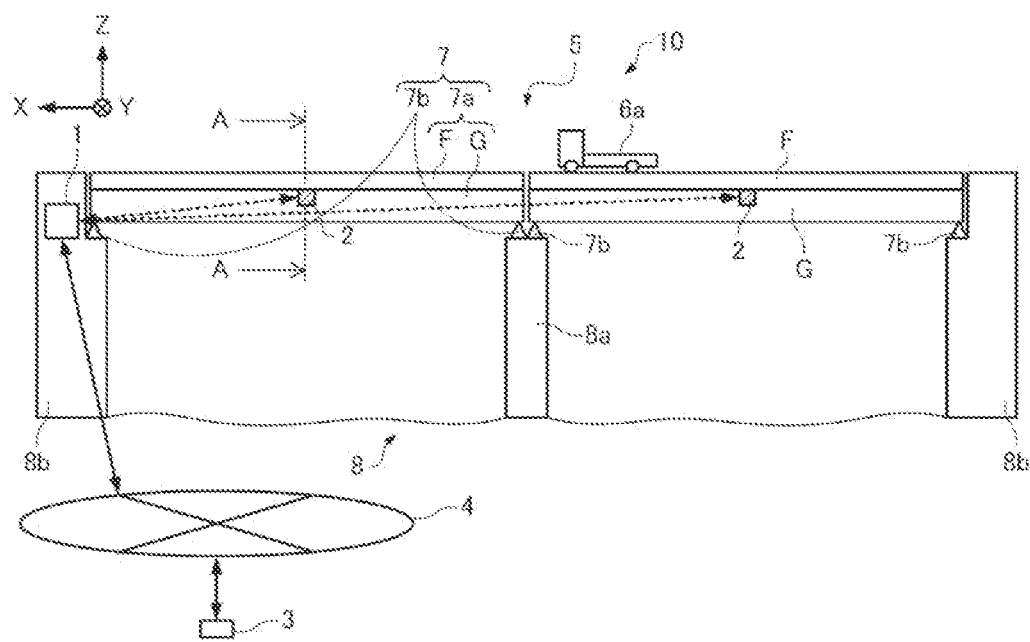
FIG. 31 is a diagram showing another configuration example of a measurement system according to the second embodiment.
Figure 32:
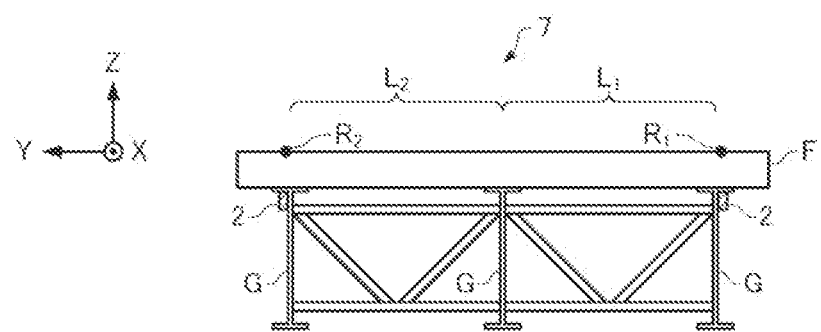
FIG. 32 is a cross-sectional view of a superstructure in FIG. 31 taken along line A-A.

In the above embodiments, the bridge 5 is a railway bridge, and the moving body moving on the bridge 5 is the railway vehicle 6. The bridge 5 may be a road bridge, and the moving body moving on the bridge 5 may be a vehicle such as an automobile, a road train, a truck, or a construction vehicle. FIG. 31 shows a configuration example of the measurement system 10 when the bridge 5 is a road bridge and a vehicle 6a moves on the bridge 5. In FIG. 31, the same components as those in FIG. 1 are denoted by the same reference numerals. As shown in FIG. 31, the bridge 5, which is a road bridge, includes the superstructure 7 and the substructure 8, similarly to the railway bridge. FIG. 32 is a cross-sectional view of the superstructure 7 taken along line A-A of FIG. 31. As shown in FIGS. 31 and 32, the superstructure 7 includes the bridge floor 7a including the floor plate F, the main girder G, and a cross girder which is not shown and the bearings 7b. As shown in FIG. 31, the substructure 8 includes the bridge pier 8a and the bridge abutment 8b. The superstructure 7 is a structure across any one of the bridge abutment 8b and the bridge pier 8a adjacent to each other, two adjacent bridge abutments 8b, or two adjacent bridge piers 8a. Both end portions of the superstructure 7 are located at positions of the bridge abutment 8b and the bridge pier 8a adjacent to each other, at positions of the two adjacent bridge abutments 8b, or at positions of the two adjacent bridge piers 8a. The bridge 5 is, for example, a steel bridge, a girder bridge, or an RC bridge.

Each accelerometer 2 is installed at a central portion of the superstructure 7 in a longitudinal direction, specifically, at a central portion of the main girder G in the longitudinal direction. However, each accelerometer 2 only needs to be able to detect an acceleration for calculating the displacement of the superstructure 7, and an installation position thereof is not limited to the central portion of the superstructure 7. When each accelerometer 2 is provided on the floor plate F of the superstructure 7, the accelerometer 2 may be damaged due to traveling of the vehicle 6a. Since the measurement accuracy may be affected by local deformation of the bridge floor 7a, in the examples of FIGS. 31 and 32, each accelerometer 2 is provided at the main girder G of the superstructure 7.

As shown in FIG. 32, the superstructure 7 has two lanes $L_1$ and $L_2$ on which the vehicle 6a as a moving body can move and three main girders G. In the example of FIGS. 31 and 32, in the central portion of the superstructure 7 in the longitudinal direction, the accelerometers 2 are respectively provided at two main girders at two ends, an observation point $R_1$ is provided at a position of a surface of the lane $L_1$ in a vertically upward direction of one of the accelerometers 2, and an observation point $R_2$ is provided at a position of a surface of the lane $L_2$ in the vertically upward direction of the other of the accelerometers 2. That is, the two accelerometers 2 are observation devices for observing the observation points $R_1$ and $R_2$, respectively. The two accelerometers 2 for respectively observing the observation points $R_1$ and $R_2$ may be provided at positions where accelerations generated at the observation points $R_1$ and $R_2$ due to the traveling of the vehicle 6a can be detected, and are preferably provided at positions close to the observation points $R_1$ and $R_2$. The number and installation positions of the accelerometers 2, and the number of the lanes are not limited to the example shown in FIGS. 31 and 32, and various modifications can be made.

The measurement device 1 estimates, based on the acceleration data output from the accelerometer 2 when the vehicle 6a passes through the superstructure 7 and the conversion function $f_{conv}$, the displacement amplitude of the superstructure 7 when the vehicle 6a passes through the superstructure 7, specifically, the displacement amplitude of the lanes $L_1$ and $L_2$.

The measurement device 1 transmits information on the estimated displacement amplitude of the superstructure 7 to the monitoring device 3 via the communication network 4. The monitoring device 3 may store the information in a storage device which is not shown, and may perform, based on the information, processing such as monitoring of the vehicle 6a or determination of an abnormality in the superstructure 7. Since the method of estimating the displacement amplitude of the superstructure 7 by the measurement device 1 is the same as that of any of the above embodiments, the detailed description thereof is omitted.

In the above embodiments, each accelerometer 2 is provided at the main girder G of the superstructure 7. The accelerometer 2 may be provided on the surface of or inside the superstructure 7, at the lower surface of the floor plate F, at the bridge pier 8a, or the like. In the above embodiments, the superstructure of the bridge is described as an example of the structure, but the present disclosure is not limited thereto, and any structure may be used as long as the structure is deformed due to the movement of the moving body.

The above embodiments and modifications are merely examples, and the present disclosure is not limited thereto. For example, it is also possible to appropriately combine each embodiment and each modification.

The present disclosure includes a configuration substantially the same as the configuration described in the embodiment, for example, a configuration having the same function, method, and result, or a configuration having the same purpose and effect. The present disclosure includes a configuration obtained by replacing a non-essential portion of the configuration described in the embodiment. The present disclosure includes a configuration having the same functions and effects as the configurations described in the embodiments, or a configuration capable of achieving the same objects. In addition, the present disclosure includes a configuration in which a known technique is added to the configuration described in the embodiment.

The following contents are derived from the above embodiments and modifications.

A measurement method according to an aspect includes: an acceleration data acquisition step of acquiring acceleration data output from an accelerometer that observes an observation point of a structure when a moving body moves on the structure; a speed vibration component calculation step of calculating a first speed vibration component by performing integration processing and filter processing on an acceleration based on the acceleration data; and a displacement amplitude estimation step of estimating a displacement amplitude of the structure when the moving body moves on the structure based on an amplitude of the first speed vibration component and a conversion function calculated based on an approximate expression of deflection of the structure and environmental information including a dimension of the moving body, a dimension of the structure, and a position of the observation point, which are created in advance.

In the present measurement method, since drift does not occur in the displacement modeled based on the approximate expression of the deflection of the structure and the environmental information, the conversion function calculated in advance has relatively high conversion accuracy. In the present measurement method, since the first speed vibration component is calculated by performing the integration processing and the filter processing on the acceleration based on the acceleration data output from the accelerometer when the moving body moves on the structure, the drift included in the first speed vibration component is reduced by the filter processing. Further, in the present measurement method, the displacement amplitude of the structure when the moving body moves on the structure is estimated based on the amplitude of the first speed vibration component and the conversion function. Therefore, the influence of a significant drift caused by twice integrating the acceleration based on the acceleration data does not occur. Therefore, according to the present measurement method, it is possible to accurately estimate the displacement amplitude of the structure when the moving body moves on the structure.

According to the present measurement method, since the influence of the significant drift due to twice integrating the acceleration does not occur, the drift correction processing is not required, and the simpler displacement amplitude is estimated instead of the displacement waveform of the structure when the moving body moves on the structure. Therefore, an amount of calculation for estimation is small, and it is possible to implement an increase in speed and a reduction in cost of estimation processing.

According to the present measurement method, in order to estimate the displacement amplitude of the structure when the moving body moves on the structure, an accelerometer which has a higher degree of freedom of installation than a displacement meter or a distortion gauge and can be easily installed is used, and thus the reduction in cost is possible.

The measurement method according to the above aspect may further include: a conversion function calculation step of calculating the conversion function. The conversion function calculation step may include generating, based on the acceleration data, observation information including an entry time point and an exit time point of the moving body with respect to the structure and the number of vehicles of the moving body, calculating, based on the approximate expression of the deflection of the structure, the observation information, and the environmental information, a deflection amount of the structure by the moving body, calculating a second speed vibration component by performing differential processing and the filter processing on a displacement based on the deflection amount, and calculating, as the conversion function, a function representing a relationship between the displacement amplitude based on the deflection amount and an amplitude of the second speed vibration component.

In the present measurement method, the deflection amount of the structure by the moving body is calculated with high accuracy based on the approximate expression of the deflection of the structure, the environmental information, and the acceleration data output from the accelerometer when the moving body moves on the structure, and the function representing the relationship between the displacement amplitude based on the deflection amount calculated with high accuracy and the amplitude of the second speed vibration component with high accuracy obtained by performing the differential processing and the filter processing on the displacement is calculated as the conversion function, so that the conversion function with high accuracy is obtained. Therefore, according to the present measurement method, it is possible to accurately estimate the displacement amplitude of the structure when the moving body moves on the structure based on the conversion function with high accuracy.

In the measurement method according to the above aspect, the conversion function may be defined as a first conversion function, and the first conversion function may be selected from a plurality of conversion functions calculated on an assumption that at least one of a length of a vehicle of the moving body, the number of vehicles of the moving body, a length of the structure, the position of the observation point, a passing time of the moving body across the structure, and an average speed of the moving body is set as a parameter, based on the approximate expression of the deflection and the environmental information, based on observation information including the entry time point and the exit time point of the moving body with respect to the structure, and the number of vehicles of the moving body.

In the present measurement method, when the moving body moves on the structure, the first conversion function is selected from the plurality of conversion functions calculated in advance with high accuracy based on the approximate expression of the deflection of the structure and the environmental information, and the displacement amplitude of the structure is estimated based on the selected first conversion function. Therefore, it is not necessary to calculate the first conversion function every time the moving body moves on the structure. Therefore, according to the present measurement method, an amount of calculation for estimating the displacement of the structure is smaller, and it is possible to implement an increase in speed and a reduction in cost of the estimation processing.

The measurement method according to the above aspect may further include: a conversion function calculation step of calculating the plurality of conversion functions. The conversion function calculation step may include calculating a plurality of deflection amounts of the structure when it is assumed that the moving body moves on the structure on an assumption that at least one of the length of the vehicle of the moving body, the number of vehicles of the moving body, the length of the structure, the position of the observation point, the passing time of the moving body across the structure, and the average speed of the moving body is set as the parameter, based on the approximate expression of the deflection and the environmental information, calculating a plurality of speed vibration components by performing the differential processing and the filter processing on a displacement based on each of the plurality of deflection amounts, and calculating, as the plurality of conversion functions, a plurality of functions representing a relationship between the displacement amplitude based on each of the plurality of deflection amounts and the amplitude of each of the plurality of speed vibration components.

According to the present measurement method, the plurality of deflection amounts of the structure when the parameter is set to a plurality of values are calculated with high accuracy based on the approximate expression of deflection and the environmental information, and the plurality of functions representing the relationship between the displacement amplitude based on each of the plurality of deflection amounts calculated with high accuracy and the amplitude of each of the plurality of speed vibration components with high accuracy obtained by performing the differential processing and the filter processing on the displacement are calculated as the plurality of conversion functions. Therefore, the plurality of conversion functions with high accuracy can be obtained.

The measurement method according to the above aspect may further include: an observation information generation step of generating, based on the acceleration data, the observation information including the entry time point and the exit time point of the moving body with respect to the structure and the number of vehicles of the moving body, and a conversion function selection step of selecting the first conversion function from the plurality of conversion functions based on the environmental information and the observation information.

In the present measurement method, it is possible to select an appropriate first conversion function from a plurality of conversion functions with high accuracy based on the environmental information and the observation information calculated based on the acceleration data output from the accelerometer when the moving body moves on the structure, and accurately estimate the displacement amplitude of the structure when the moving body moves on the structure based on the selected first conversion function.

In the measurement method according to the above aspect, the approximate expression of the deflection of the structure may be an equation based on a structural model of the structure.

According to the present measurement method, it is possible to calculate the deflection amount reflecting a configuration of the structure on which the moving body moves, and to calculate the conversion function with high accuracy.

In the measurement method according to the above aspect, the structural model may be a simple beam whose both ends are supported.

According to the present measurement method, it is possible to calculate a conversion function with high accuracy when the moving body moves on a structure having a configuration similar to the simple beam.

In the measurement method according to the above aspect, the structure may be a superstructure of a bridge.

According to the present measurement method, it is possible to accurately calculate the displacement amplitude of the superstructure when the moving body moves on the superstructure of the bridge by the processing with a small amount of calculation.

In the measurement method according to the above aspect, the moving body may be a vehicle or a railway vehicle.

According to the present measurement method, it is possible to accurately calculate the displacement amplitude of the structure when the vehicle or the railway vehicle moves on the structure by processing with a small amount of calculation.

In the measurement method according to the above aspect, the structure may be a structure in which bridge weigh in motion (BWIM) functions.

A measurement device according to an aspect includes: an acceleration data acquisition unit configured to acquire acceleration data output from an accelerometer that observes an observation point of a structure when a moving body moves on the structure; a speed vibration component calculation unit configured to calculate a first speed vibration component by performing integration processing and filter processing on an acceleration based on the acceleration data; and a displacement amplitude estimation unit configured to estimate a displacement amplitude of the structure when the moving body moves on the structure based on an amplitude of the first speed vibration component and a conversion function calculated based on an approximate expression of deflection of the structure and environmental information including a dimension of the moving body, a dimension of the structure, and a position of the observation point, which are created in advance.

In the measurement device, since drift does not occur in the displacement modeled based on the approximate expression of the deflection of the structure and the environmental information, the conversion function calculated in advance has relatively high conversion accuracy. In the present measurement device, since the first speed vibration component is calculated by performing the integration processing and the filter processing on the acceleration based on the acceleration data output from the accelerometer when the moving body moves on the structure, the drift included in the first speed vibration component is reduced by the filter processing. Further, in the present measurement device, the displacement amplitude of the structure when the moving body moves on the structure is estimated based on the amplitude of the first speed vibration component and the conversion function. Therefore, the influence of a significant drift caused by twice integrating the acceleration based on the acceleration data does not occur. Therefore, according to the present measurement device, it is possible to accurately estimate the displacement amplitude of the structure when the moving body moves on the structure.

According to the present measurement device, since the influence of the significant drift due to twice integrating the acceleration does not occur, the drift correction processing is not required, and the simpler displacement amplitude is estimated instead of the displacement waveform of the structure when the moving body moves on the structure. Therefore, an amount of calculation for estimation is small, and it is possible to implement an increase in speed and a reduction in cost of estimation processing.

According to the present measurement device, in order to estimate the displacement amplitude of the structure when the moving body moves on the structure, an accelerometer which has a higher degree of freedom of installation than a displacement meter or a distortion gauge and can be easily installed is used, and thus the reduction in cost is possible.

A measurement system according to an aspect includes: the measurement device according to the above aspect; and the accelerometer.

According to an aspect of the present disclosure, a non-transitory computer-readable storage medium stores a measurement program, the measurement program causing a computer to execute: an acceleration data acquisition step of acquiring acceleration data output from an accelerometer that observes an observation point of a structure when a moving body moves on the structure; a speed vibration component calculation step of calculating a first speed vibration component by performing integration processing and filter processing on an acceleration based on the acceleration data; and a displacement amplitude estimation step of estimating a displacement amplitude of the structure when the moving body moves on the structure based on an amplitude of the first speed vibration component and a conversion function calculated based on an approximate expression of deflection of the structure and environmental information including a dimension of the moving body, a dimension of the structure, and a position of the observation point, which are created in advance.

In the measurement program, since drift does not occur in the displacement modeled based on the approximate expression of the deflection of the structure and the environmental information, the conversion function calculated in advance has relatively high conversion accuracy. In the present measurement program, since the first speed vibration component is calculated by performing the integration processing and the filter processing on the acceleration based on the acceleration data output from the accelerometer when the moving body moves on the structure, the drift included in the first speed vibration component is reduced by the filter processing. Further, in the present measurement program, the displacement amplitude of the structure when the moving body moves on the structure is estimated based on the amplitude of the first speed vibration component and the conversion function. Therefore, the influence of a significant drift caused by twice integrating the acceleration based on the acceleration data does not occur. Therefore, according to the present measurement program, it is possible to accurately estimate the displacement amplitude of the structure when the moving body moves on the structure.

According to the present measurement program, since the influence of the significant drift due to twice integrating the acceleration does not occur, the drift correction processing is not required, and the simpler displacement amplitude is estimated instead of the displacement waveform of the structure when the moving body moves on the structure. Therefore, an amount of calculation for estimation is small, and it is possible to implement an increase in speed and a reduction in cost of estimation processing.

According to the present measurement program, in order to estimate the displacement amplitude of the structure when the moving body moves on the structure, an accelerometer which has a higher degree of freedom of installation than a displacement meter or a distortion gauge and can be easily installed is used, and thus the reduction in cost is possible.

What is claimed is:

1. A measurement method for causing a processor to execute a program stored in a memory, the measurement method comprising executing on the processor the steps of:
    installing an accelerometer at an installation position of a superstructure of a bridge, the installation position being located below an observation point along a vertical direction;
    acquiring acceleration data output from the accelerometer that observes the observation point of the superstructure of the bridge when a vehicle moves on the superstructure;
    integrating an acceleration of the acceleration data to obtain an integral speed;
    calculating a first speed vibration component by performing high-pass filter processing on the integral speed, the first speed vibration component including a first maximum value and a first minimum value;
    calculating a first speed amplitude corresponding to a difference between the first maximum and minimum values of the first speed vibration component;
    calculating a conversion function using an approximate expression of deflection of the superstructure and environmental information including a dimension of the vehicle, a dimension of the superstructure, and a position of the observation point, which are created in advance;
    estimating a displacement amplitude of the superstructure based on the first speed amplitude and the conversion function when the vehicle moves on the superstructure; and
    determining an abnormality of the superstructure based on the estimated displacement amplitude of the superstructure.

2. The measurement method according to claim 1, wherein
    the calculating of the conversion function further includes:
        generating, based on the acceleration data, observation information including an entry time point and an exit time point of the vehicle with respect to the superstructure and a number of bodies of the vehicle;
        calculating, based on the approximate expression of the deflection of the superstructure, the observation information, and the environmental information, a deflection amount of the superstructure by the vehicle;
        calculating a second speed vibration component by performing differential processing and the high-pass filter processing on a displacement based on the deflection amount, and
        calculating, as the conversion function, a function representing a relationship between the displacement amplitude based on the deflection amount and an amplitude of the second speed vibration component.

3. The measurement method according to claim 1, wherein
the conversion function is defined as a first conversion function, and
the first conversion function is selected from a plurality of conversion functions calculated on an assumption that at least one of a length of a body of a plurality of bodies of the vehicle, a number of the plurality of bodies of the vehicle, a length of the superstructure, the position of the observation point, a passing time of the vehicle across the superstructure, and an average speed of the vehicle is set as a parameter, based on the approximate expression of the deflection and the environmental information, based on observation information including an entry time point and an exit time point of the vehicle with respect to the superstructure, and the number of bodies of the vehicle.

4. The measurement method according to claim 3, further comprising:
calculating the plurality of conversion functions, wherein the calculating of the conversion function includes:
calculating a plurality of deflection amounts of the superstructure when it is assumed that the vehicle moves on the superstructure on an assumption that at least one of the length of the body of the vehicle, the number of bodies of the vehicle, the length of the superstructure, the position of the observation point, the passing time of the vehicle across the superstructure, and the average speed of the vehicle is set as the parameter, based on the approximate expression of the deflection and the environmental information;
calculating a plurality of first speed vibration components by performing the differential processing and the high-pass filter processing on a displacement based on each of the plurality of deflection amounts; and
calculating, as the plurality of conversion functions, a plurality of functions representing a relationship between the displacement amplitude based on each of the plurality of deflection amounts and the amplitude of each of the plurality of speed vibration components.

5. The measurement method according to claim 3, further comprising:
generating, based on the acceleration data, the observation information including the entry time point and the exit time point of the vehicle with respect to the superstructure and the number of the plurality of bodies of the vehicle; and
selecting the first conversion function from the plurality of conversion functions based on the environmental information and the observation information.

6. The measurement method according to claim 1, wherein
the approximate expression of the deflection of the superstructure is an equation based on a structural model of the superstructure.

7. The measurement method according to claim 6, wherein
the structural model is a simple beam whose both ends are supported.

8. The measurement method according to claim 1, wherein
the vehicle is a railway vehicle.

9. The measurement method according to claim 1, wherein
the superstructure is a structure in which bridge weigh in motion (BWIM) functions.

10. A measurement device comprising:
an accelerometer installed at an installation position of a superstructure of a bridge, the installation position being located below an observation point along a vertical direction;
a memory configured to store a program; and
a processor configured to execute the program so as to:
acquire acceleration data output from the accelerometer that observes the observation point of the superstructure of the bridge when a vehicle moves on the superstructure;
integrating an acceleration of the acceleration data to obtain an integral speed;
calculating a first speed vibration component by performing high-pass filter processing on the integral speed, the first speed vibration component including a first maximum value and a first minimum value;
calculating a first speed amplitude corresponding to a difference between the first maximum and minimum values of the first speed vibration component;
calculating a conversion function using an approximate expression of deflection of the superstructure and environmental information including a dimension of the vehicle, a dimension of the superstructure, and a position of the observation point, which are created in advance;
estimating a displacement amplitude of the superstructure based on the first speed amplitude and the conversion function when the vehicle moves on the superstructure; and
determine an abnormality of the superstructure based on the estimated displacement amplitude of the superstructure.

11. A non-transitory computer-readable storage medium storing a measurement program for causing a computer to execute a process by a processor so as to perform the steps of:
acquiring acceleration data output from an accelerometer that observes an observation point of a superstructure of a bridge when a vehicle moves on the superstructure, the accelerometer being installed at an installation position of the superstructure, the installation position being located below the observation point along a vertical direction;
integrating an acceleration of the acceleration data to obtain an integral speed;
calculating a first speed vibration component by performing high-pass filter processing on the integral speed, the first speed vibration component including a first maximum value and a first minimum value;
calculating a first speed amplitude corresponding to a difference between the first maximum and minimum values of the first speed vibration component;
calculating a conversion function using an approximate expression of deflection of the superstructure and environmental information including a dimension of the vehicle, a dimension of the superstructure, and a position of the observation point, which are created in advance;
estimating a displacement amplitude of the superstructure based on the first speed amplitude and the conversion function when the vehicle moves on the superstructure; and determining an abnormality of the superstructure based on the estimated displacement amplitude of the superstructure.

* * * * *